US010796283B2

(12) United States Patent
Padmanaban et al.

(10) Patent No.: US 10,796,283 B2
(45) Date of Patent: Oct. 6, 2020

(54) DYNAMICALLY DELETING RECEIVED DOCUMENTS BASED ON A GENERATED EXPIRATION DEADLINE FOR AN EVENT LAPSING

(71) Applicant: International Business Machines Corporation, Armonk, NY (US)

(72) Inventors: Manikandan Padmanaban, Bangalore (IN); Gopalakrishnan Sankararamasubramanian, Chennai (IN); Srikanth G. Tamilselvam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/139,578

(22) Filed: Sep. 24, 2018

(65) Prior Publication Data
US 2020/0097911 A1 Mar. 26, 2020

(51) Int. Cl.
*G06Q 10/10* (2012.01)
*G06F 9/54* (2006.01)
*H04L 12/58* (2006.01)

(52) U.S. Cl.
CPC .......... *G06Q 10/107* (2013.01); *G06F 9/542* (2013.01); *H04L 51/08* (2013.01); *H04L 51/26* (2013.01)

(58) Field of Classification Search
CPC ......... H04L 51/22; H04L 51/04; H04L 51/08; H04L 51/26; G06F 17/2705; G06F 17/2785; G06F 9/542; G06Q 10/107
See application file for complete search history.

(56) References Cited

U.S. PATENT DOCUMENTS

| 7,475,120 | B1 | 1/2009 | Ngo et al. |
| 8,832,268 | B1 | 9/2014 | Chheda et al. |
| 2003/0126215 | A1 | 7/2003 | Udell et al. |
| 2005/0132010 | A1 | 6/2005 | Muller |
| 2009/0113002 | A1* | 4/2009 | Zellner ............... G06Q 10/107 709/206 |
| 2011/0047228 | A1 | 2/2011 | Balasaygun |
| 2011/0106892 | A1* | 5/2011 | Nelson ................. G06Q 10/109 709/206 |
| 2012/0271896 | A1 | 10/2012 | Adams et al. |
| 2013/0061085 | A1 | 3/2013 | Rao |

(Continued)

OTHER PUBLICATIONS

Senaka Buthpitiya et al., Mobile Context-Aware Personal Messaging Assistant, Carnegie Melon Silicon Valley, 19 pages.

(Continued)

*Primary Examiner* — Soe Hlaing
(74) *Attorney, Agent, or Firm* — Robert J. Shatto

(57) ABSTRACT

Methods and program products for dynamically managing electronic mail (e-mail) messages. The methods may include evaluating text included in the e-mail message, identifying a future event based on the evaluated text included in the e-mail message, and generating an expiration deadline for the identified future event based on the evaluated text included in the e-mail message. The method may also include determining if the generated expiration deadline for the identified future event has lapsed. If the generated expiration deadline for the identified future event has lapsed, a status of the e-mail message may be dynamically adjusted.

20 Claims, 28 Drawing Sheets

(56) References Cited

U.S. PATENT DOCUMENTS

| 2013/0218982 | A1* | 8/2013 | Hymel | G06Q 10/1093 |
| | | | | 709/206 |
| 2015/0331881 | A1* | 11/2015 | Myles | G06F 16/162 |
| | | | | 707/689 |
| 2016/0094500 | A1 | 3/2016 | Baca et al. | |
| 2016/0350173 | A1 | 12/2016 | Ahad | |
| 2017/0243465 | A1* | 8/2017 | Bourne, Jr. | G08B 21/24 |

OTHER PUBLICATIONS

Xiao Ding et al., Deep Learning for Event-Driven Stock Prediction, International Joint Conference on Artificial Intelligence, 2015, pp. 2327-2333.

Kelly, S., "7 Free Self Destructing Message Apps for Android Phone / Mashtips," https://mashtips.com/self-destructive-message-apps-for-android/, printed Oct. 23, 2019, 4 pgs.

Unknown, "Email archiving product specifications," https://searchstorage.techtargel.com/tutorial/email-archiving-product-specifications, published Mar. 25, 2008, printed Oct. 23, 2019, 13 pgs.

Unknown, "Information Protection to Conserve Your Digital Brand-Proofpoint," https://www.proofpoint.com/us/solutions/needs/compliance, printed Oct. 23, 2019, 3 pgs.

Buthpitiya et al., "Mobile Context-Aware Personal Messaging Assistant," http://repository.cmu.edu/cgi/viewcontent.cgi?article=1023&context=silicon_valley, Carnegie Mellon Silicon Valley, accessed Oct. 30, 2019, 19 pgs.

Unknown, "The Different Types of Emails," https://app.mailjet.com/docs/email_types, printed Oct. 23, 2019, 2 pgs.

\* cited by examiner

DYNAMICALLY DELETING RECEIVED DOCUMENTS BASED ON A GENERATED EXPIRATION DEADLINE FOR AN EVENT LAPSING

TECHNICAL FIELD

The disclosure relates generally to e-mail messaging programs or applications, and more particularly to methods and program products for dynamically managing electronic mail (e-mail) messages.

BACKGROUND

Electronic mail, or e-mail, is a widespread software program used to transmit and receive messages over a communications network (e.g., Internet). Users with e-mail-enabled electronic devices (e.g., computers, tablets, cell phones, and the like) can send e-mail messages to others users. Some users can receive several hundred e-mail messages in a day. Unless regularly managed, a user's mailboxes or folders (e.g., inbox, archive, deleted items) can become overrun with saved e-mail messages. Many of those saved e-mail messages may no longer be useful and/or important to the user.

Cluttered and disorganized e-mail mailboxes or folders often create issues and disadvantages to its users. Companies and e-mail service provides often need to continuously spend money and/or time on the e-mail servers and/or software in order to maintain the large number of saved e-mail messages. Additionally, users of the e-mail software have difficulty sorting and/or organizing the mass of e-mails. Often it takes the user a great deal of time and effort to maintain and organize e-mail mailboxes or folders, thus making them less efficient and/or allowing less time for other tasks in their jobs and/or personal life.

Some conventional e-mail programs allow for the automated deletion of e-mail messages to help organize, reduce mailbox clutter, and/or reduce the user's time in organizing e-mail mailboxes or folders. However, in these conventional programs, the automated deletion is based on static rules established by the sending party and/or recipient of the e-mail. While this may save time in the future or back end, it requires users of the e-mail software to establish the rules for deleting the e-mail before sending—which in turn requires additional time and/or review before sending the e-mail. Furthermore, in certain circumstances it may be undesirable to delete e-mails. Unless a user changes the established, static rules, then these sensitive e-mails may be deleted unbeknownst to the user. In this example, it requires the user to be more attentive and/or aware of these established rules, which in turn requires more of the user's time and/or energy.

SUMMARY

Aspects of the disclosure provide methods and program products for dynamically managing electronic mail (e-mail) messages.

A first aspect discloses a method for dynamically managing an electronic mail (e-mail) message. The method includes: evaluating text included in the e-mail message; identifying a future event based on the evaluated text included in the e-mail message; generating an expiration deadline for the identified future event based on the evaluated text included in the e-mail message; determining if the generated expiration deadline for the identified future event has lapsed; and in response to determining the generated expiration deadline for the identified future event has lapsed, dynamically adjusting a status of the e-mail message.

A second aspect discloses a computer program product stored on a computer readable storage medium, which when executed by a computing system, dynamically manages an electronic mail (e-mail) message. The program product includes: program code that evaluates text included in the e-mail message; program code that identifies a future event based on the evaluated text included in the e-mail message; program code that generates an expiration deadline for the identified future event based on the evaluated text included in the e-mail message; program code that determines if the generated expiration deadline for the identified future event has lapsed; and program code that dynamically adjusts a status of the e-mail message in response to the program code determining the generated expiration deadline for the identified future event has lapsed.

A third aspect discloses a computerized method that dynamically manages an electronic mail (e-mail) message. The method includes: evaluating text included in the e-mail message; identifying a future event based on the evaluated text included in the e-mail message; generating an expiration deadline for the identified future event based on the evaluated text included in the e-mail message; determining if the generated expiration deadline for the identified future event has lapsed; and in response to determining the generated expiration deadline for the identified future event has lapsed, dynamically adjusting a status of the e-mail message.

The illustrative aspects of the present disclosure solve the problems herein described and/or other problems not discussed.

BRIEF DESCRIPTION OF THE DRAWINGS

These and other features of this invention will be more readily understood from the following detailed description of the various aspects of the invention taken in conjunction with the accompanying drawings in which.

Figure 1:
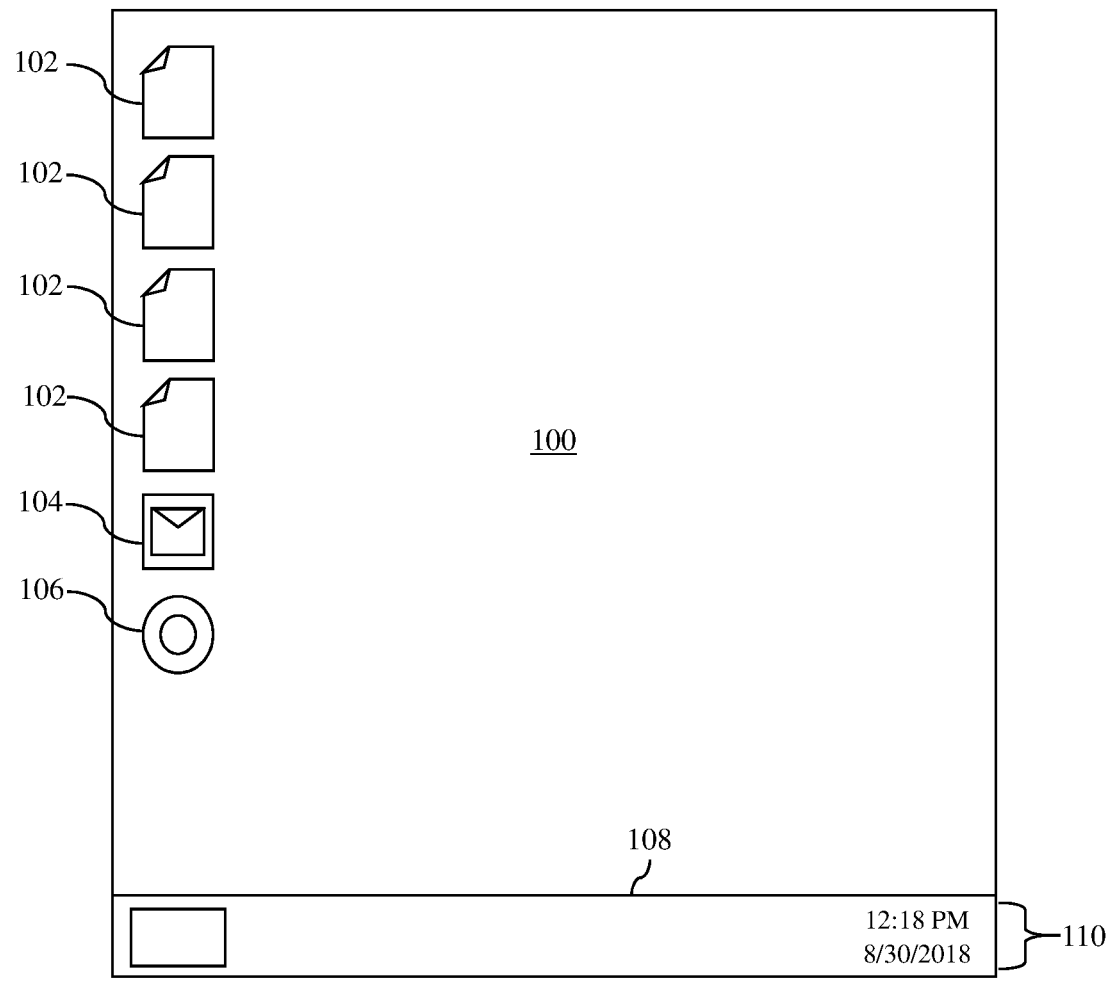
FIG. 1 depicts an illustrative front view of a desktop for a computing system including a plurality of icons, according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates generally to e-mail messaging programs or applications, and more particularly to methods and program products for dynamically managing electronic mail (e-mail) messages.

These and other embodiments are discussed below with reference to FIGS. 1-28. However, those skilled in the art will readily appreciate that the detailed description given herein with respect to these Figures is for explanatory purposes only and should not be construed as limiting.

FIG. 1 shows an illustrative front view of a desktop for a computing system (see, FIG. 28) including a plurality of icons, according to embodiments. As discussed in detail herein, the computing system, and its processing/computing device and/or components included therein, may be configured to dynamically managing electronic mail (e-mail) messages (see, FIG. 2). Dynamically managing e-mail messages discussed herein may improve a user's interaction with the e-mail messaging application on the computing system by organizing and/or removing unnecessary or expired e-mail messages, and/or may aid protecting confidential information exchanged via the e-mail messaging application.

In the non-limiting examples discussed herein, the computing system (see, FIG. 28) including an e-mail messaging application (see, FIG. 2) may be computer or computer device including, but not limited to, a laptop or desktop computer. The computing system may display the e-mail messaging application on a desktop 100, which provides a visual representation of applications included on the computing system and allows a user the ability to interact with the applications of the computing system. Desktop 100 may be provided and/or displayed using an input/output (I/O) component(s) (see, FIG. 28) of the computing system. In a non-limiting example, the I/O component(s) displaying desktop 100 may be a computer monitor. Although discussed herein as a computer or a computing device, the computing system can be implemented as any suitable device including, but not limited, a smart phone, a tablet computing device, a gaming device, a display, a digital music player, a wearable computing device or display such as a watch, and other suitable type of computing system that includes an e-mail messaging application.

Desktop 100 may also include a plurality of icons 102, 104, 106. Specifically, desktop 100 may provide, display, and/or visually depict a plurality of icons 102, 104, 106, where each icon of the plurality of icons 102, 104, 106 may be associated with a system or "generic" function of the computing system, a document stored on the computing system, or a program or application (commonly known as an "App") included within the computing system. In a non-limiting example shown in FIG. 1, the plurality of document icons 102 may be associated with distinct text documents stored on computing system that when interacted with, may provide access to the text document run by a word processing program stored on the computing system. The text documents associated with the document icons 102 may be displayed on desktop 100. E-mail messaging icon 104 may be associated with an e-mail messaging application stored on computing system that when interacted with, may provide the user access to their inbox and the various e-mail messages included therein. As discussed herein, the inbox and various e-mail messages of the e-mail messaging application associated with e-mail messaging icon 104 may be displayed on and interacted with on desktop 100. Internet browser icon 106 may be associated with an internet browser application stored on computing system that when interacted with, may provide the user access to the internet. Similar to the text documents and/or e-mail messaging application, the internet browser associated with internet browser icon 106 may be displayed on and interacted with on desktop 100.

As discussed herein, the plurality of application icons 102, 104, 106 may be associated with interactive documents or applications of computing system. The documents or applications associated with the plurality of application icons 102, 104, 106 may be stored within any suitable memory or storage device (internal, external, cloud-based and so on) on and/or associated with computing system and may be configured to be interacted with by a user of the computing system for providing communication capabilities and/or information to the user.

Desktop 100 may also include a taskbar 108. In a non-limiting example, taskbar 108 may provide access to various applications, documents, and/or folders included within the computing system. Additionally, and as shown in the non-limiting example, taskbar 108 may include a current time-date indicator 110. Current time-date indicator 110 may display the current time of day (e.g., 12:18 PM) and the current date (e.g., Aug. 30, 2018, 8/30/2018) on desktop 100. The time and date displayed in current time-date indicator 110 may be determined by a user's specific input, or alternatively, may be automatically generated by the computing device using the internet, an internal clock, and/or a global positioning system (GPS) including within the computing system.

Figure 2:
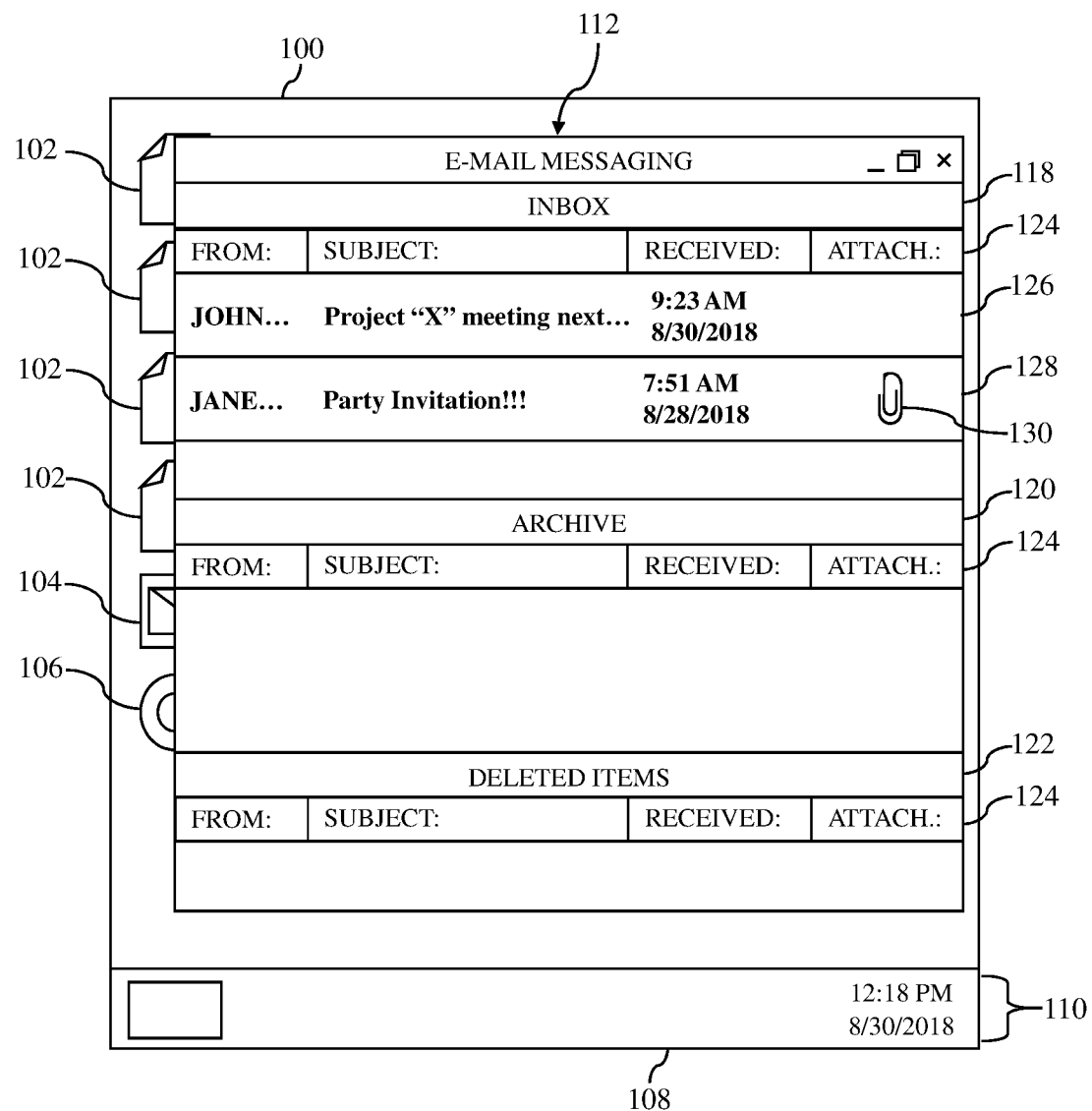
FIG. 2 depicts an illustrative front view of an inbox for an electronic mail (e-mail) messaging application included in the computing system of FIG. 1, according to embodiments.

FIG. 2 shows an illustrative front view of an e-mail messaging application 112 associated with e-mail messaging icon 104. E-mail messaging application 112 may be displayed and/or visually represented in an interactive window on desktop 100. In the non-limiting example, e-mail messaging application 112 may include a plurality of subsections or folders 118, 120, 122. Specifically, e-mail messaging application 112 may include an inbox subsection or folder 118 (hereafter, "inbox 118"), an archive subsection or folder 120 (hereafter, "archive 120"), and a deleted items subsection or folder 122 (hereafter, "deleted items 122"). Inbox 118, archive 120, and deleted items 122 may identify, indicate, and/or classify a status of e-mail messages included in and/or received by e-mail messaging application 112. As discussed herein, each of inbox 118, archive 120, and/or deleted items 122 may include and/or may be configured to receive e-mail messages sent to the user, owner, and/or e-mail address (see, FIG. 3) associated with the e-mail messaging application 112 associated with the e-mail messaging icon 104 and shown on desktop 100 of computing system (see, FIG. 28).

Additionally, as shown in the non-limiting example, each of inbox 118, archive 120, and/or deleted items 122 may include an information bar or panel 124 (hereafter, "information bar 124"). Information bar 124 may provide information, a reference, and/or a key for e-mail messages included in inbox 118, archive 120, and/or deleted items 122. In the non-limiting example shown in FIG. 2, information bar 124 for each of inbox 118, archive 120, and/or deleted items 122 included in e-mail messaging application 112 may include information relating to the sender or sending source (e.g., "FROM") of e-mail messages included in e-mail messaging application 112, the subject line (e.g., "SUBJECT") of e-mail messages included in e-mail messaging application 112, the date and time (e.g., "RECEIVED") each e-mail message included in e-mail messaging application 112 is received, and whether there is an attachment (e.g., "ATTACH.") included in the e-mail messages included in e-mail messaging application 112. It is understood that the information, references, and/or keys included in information bar 124 shown in the non-limiting examples herein is illustrative. As such, information bar 124 may include additional information, references, and/or keys including, but not limited to, the size (e.g., kilobyte (KB)), importance level of the message, and the like.

E-mail messaging application 112 may also include and/or display, via desktop 100, e-mail messages 126, 128. E-mail messages 126, 128 included in e-mail messaging application 112 may be sent to and/or received by the user, owner, and/or e-mail address (see, "DAVE@WORK.COM" in FIG. 3) associated with the e-mail messaging application 112. In the non-limiting example shown in FIG. 2, e-mail messages 126, 128 may be included, stored, and/or filed in inbox 118 of e-mail messaging application 112. That is, and as shown in FIG. 2, e-mail messages 126, 128 may both be identified as having and/or may have an inbox status. Additionally in the non-limiting example, e-mail messages 126, 128 may be identified as having and/or may have an unread status, as indicated or displayed by bolding the text or information of e-mail messages 126, 128. As discussed in other non-limiting examples herein, e-mail messages of e-mail messaging application 112 may be stored in inbox 118, archive 120, and/or deleted items 122 (see, e.g., FIGS. 7-9), and therefore may have respective statuses associated with each subsection or folder of e-mail messaging application 112. E-mail messages 126, 128 may be included, stored, and/or filed in inbox 118, archive 120, and/or deleted items 122 of e-mail messaging application 112 based on, for example, predetermined rules for e-mail messaging application 112 as defined by the user (e.g., spam filter), actions taken by the user of e-mail messaging application 112 (e.g., deleting e-mail messages 126, 128 from inbox 118 to deleted items 122), and the like. Additionally, and as discussed herein in detail, e-mail messages 126, 128 may be included, stored, and/or filed in inbox 118, archive 120, and/or deleted items 122 of e-mail messaging application 112 based on a system/process of dynamically managing e-mail messages 126, 128 using the information included/detected therein.

As shown in FIG. 2, e-mail messages 126, 128 included in e-mail messaging application 112 may include a variety of information relating to the e-mail message. For example, e-mail messages 126, 128 may include information relating to the sender or sending source of the e-mail (e.g., listed under "FROM" in information bar 124), the subject of the e-mail message (e.g., listed under "SUBJECT" in information bar 124), time and/or date information relating to when the message was sent/received by the user of e-mail messaging application 112 (e.g., listed under "RECEIVED" in information bar 124), and whether or not e-mail messages 126, 128 includes an attachment (e.g., listed under "ATTACH." In information bar 124). An attachment may be indicated and/or identified as being included within e-mail messages using a symbol or graphic 130 (hereafter, "attachment symbol 130"). For example, e-mail message 128 may include attachment symbol 130 to notify the user of e-mail messaging application 112 that e-mail message 128 includes an attachment (e.g., document, file, program, photo, and so on). Although shown as a graphic (e.g., paperclip), attachment symbol 130 may be any suitable visual identifier that may let the user of e-mail messaging application 112 know an attachment is included in an e-mail. Additionally, it is understood that the list of information included in e-mail messages 126, 128 (e.g., sender, subject, received, etc.) is exemplary, and e-mail messages 126, 128 may include more or less information when displayed in e-mail messaging application 112.

Figure 3:
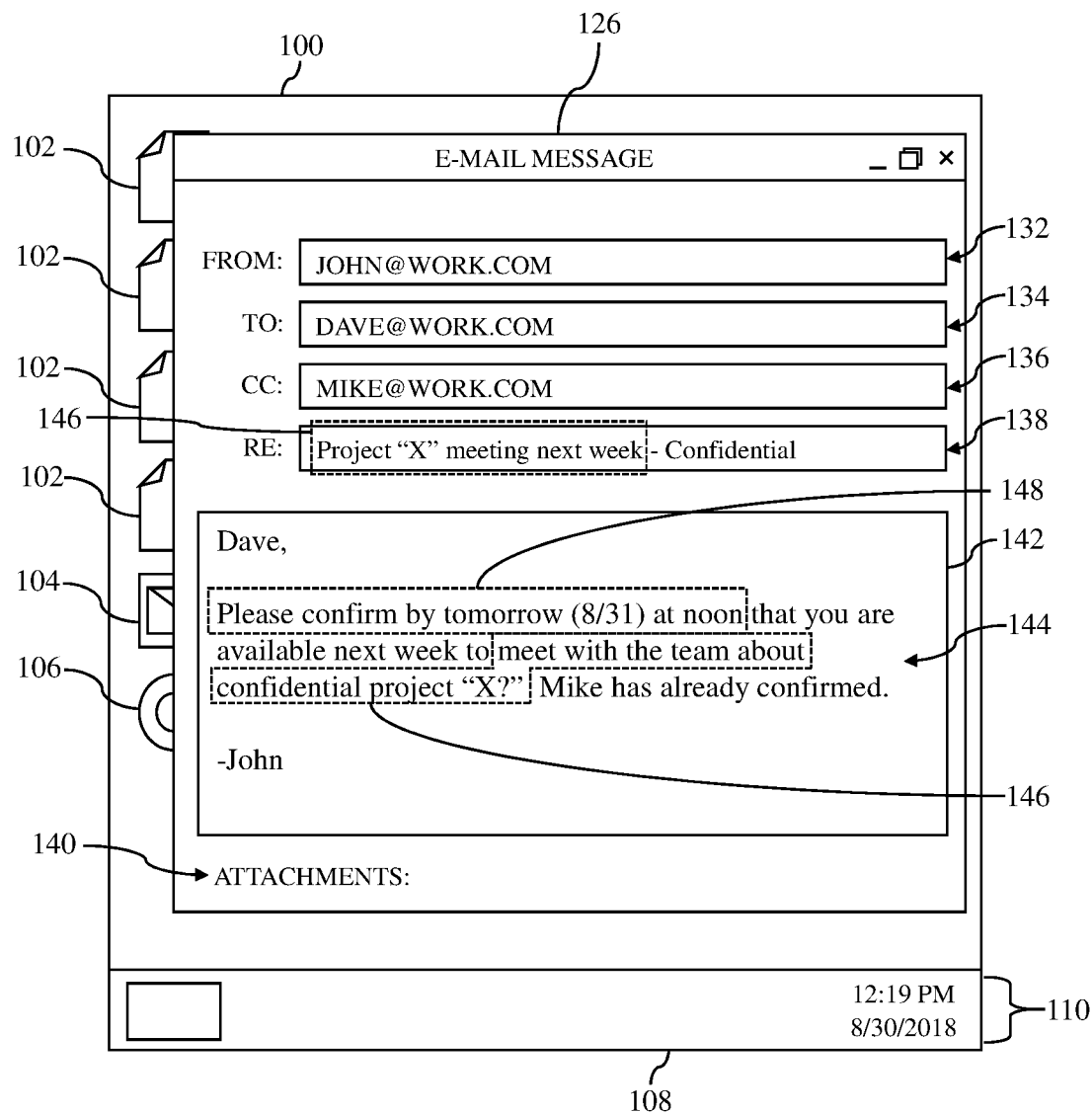
FIG. 3 depicts an illustrative front view of an e-mail message included in the inbox for the e-mail messaging application of FIG. 2, according to embodiments.

Turning to FIG. 3, an illustrative view front view of e-mail message 126 included in e-mail messaging application 112 is shown. As similarly discussed herein, e-mail message 126 may be displayed and/or visually represented in an interactive window on desktop 100. E-mail message 126 may be displayed and become visible when a user "opens" or engages (e.g., clicks using a mouse) with e-mail messaging application 112 to view the full content of e-mail message 126. In the non-limiting example shown in FIG. 3, e-mail message 126 may include a plurality of information displayed in text boxes and/or defined sections within e-mail message 126. Specifically, e-mail message 126 may include a from-section 132, a to-section 134, a cc-section 136, a subject line section 138 (hereafter, "subject line 138"), an attachment section 140, and a message body section 142 (hereafter, "message body 142"). From-section 132 may identify the sender or sending source of e-mail message 126, to-section 134 may identify the (primary) recipient of e-mail message 126, and cc-section may identify the (secondary/additional) recipient(s) of e-mail message 126. In the non-limiting example, the user of e-mail messaging application 112 may own and/or be associated with the e-mail address "DAVE@WORK.COM," and therefore may be the primary recipient of e-mail message 126 sent by "JOHN@WORK.COM."

Figure 19:
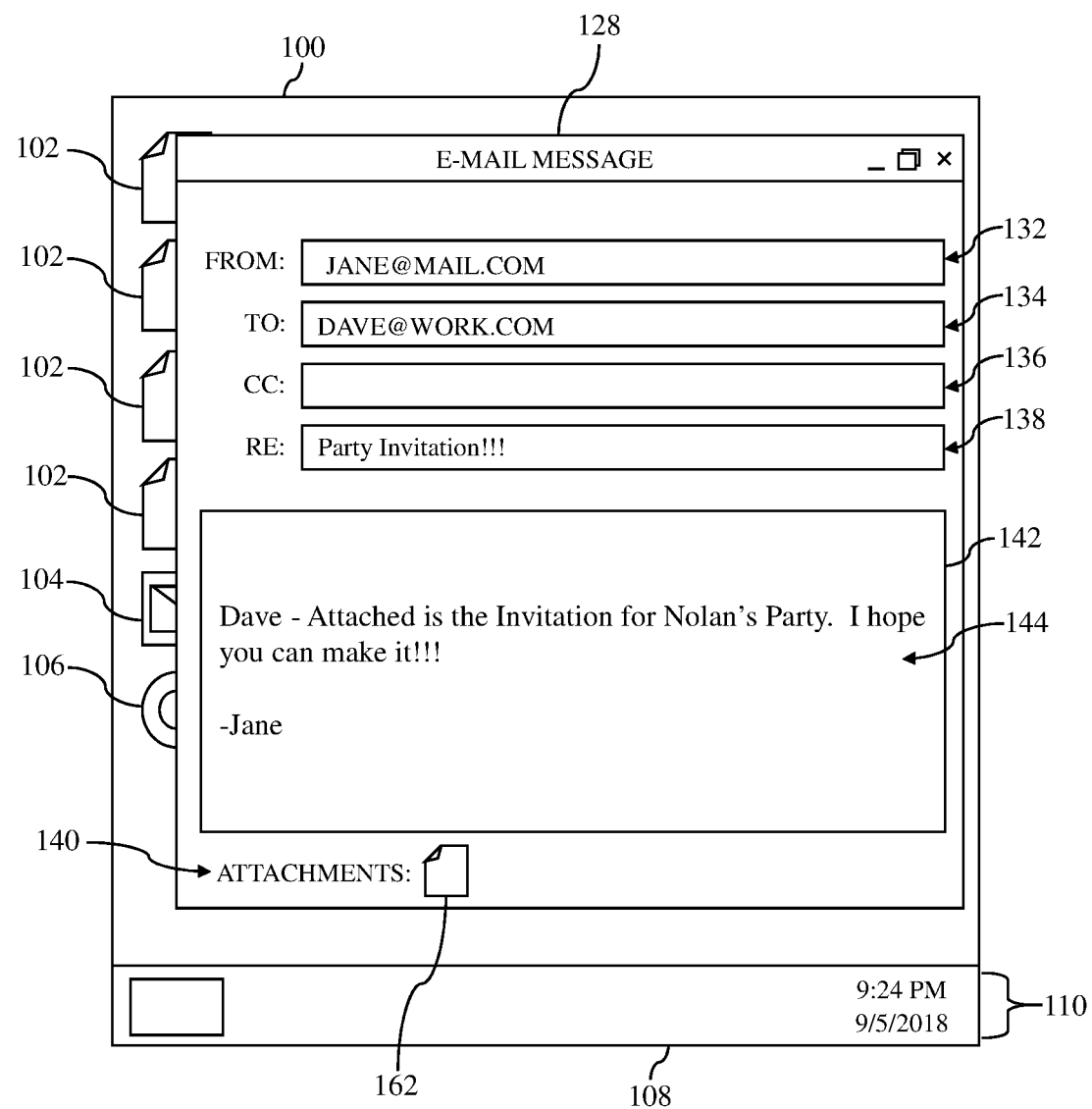
FIG. 19 depicts an illustrative front view of an e-mail message included in the inbox for the e-mail messaging application of FIG. 18, according to further embodiments.

Subject line 138 of e-mail message 126 may display a brief summary of the topic of the message for the user of e-mail messaging application 112, and attachment section 140 of e-mail message 126 may display the attached item (e.g., document, file, program, photo, and so on), and/or interactive-graphic representation of the attached item (see, FIG. 19). Additionally in the non-limiting example shown in FIG. 3, message body 142 of e-mail message 126 may include the content, context, and/or message text 144 (hereafter, "text 144") directed or delivered to user of e-mail messaging application 112 in e-mail message 126. Specifically, message body 142 of e-mail message 126 includes text 144 written by the sender or sending source (e.g., JOHN@WORK.COM) to the recipient or user (e.g., DAVE@WORK.COM) of e-mail messaging application 112 conveying a desired message or information.

With continued reference to FIG. 3, the process of dynamically managing e-mails (e.g., e-mail messages 126, 128) using the information or text included in the various sections of e-mail message 126 (e.g., text 144 of message body 142, sending source included in from-section 132, and so on) of e-mail messaging application 112 is discussed herein. E-mails of e-mail messaging application 112 may be dynamically managed using any suitable system, device, networks, and/or assemblies. For example, and as discussed herein, e-mails of e-mail messaging application 112 may be dynamically managed using any suitable computer or computing device(s) (see, FIG. 28), and/or server systems, networks, or assemblies.

In the non-limiting examples shown in FIG. 3, the information or text included in the various sections of e-mail message 126 may first be evaluated. The sections of e-mail message 126 may include, but are not limited to, message body 142, subject line 138, from-section 132, to-section 134, and/or an attachment included in attachment section 140 (see, FIGS. 11, 19, and 20). As such, the information or text included in these various sections of e-mail message 126 that may be evaluated include, but are not limited to, text 144 of message body 142, text of subject line 138, sender or sending source included in from-section 132, the (primary) recipient of e-mail message 126 included in to-section 134, and/or text included in the attachment in attachment section 140 (see, FIGS. 11, 19, and 20). The text of e-mail message 126 may be evaluated and/or analyzed using any suitable natural language processing (NLP) techniques or protocol that may review, evaluate, analyze, and/or obtain information from the text and various portions of e-mail message 126. For example, the text of e-mail message 126 may be evaluated and/or analyzed using Annotation Query Language (AQL), Structure Mapping Engine (SME), Computer-Assisted Reviewing (CAR), and the like.

Once the text included in e-mail message 126 is evaluated and/or analyzed, additional information may be determined, identified, and/or generated based on the evaluated text. For example, once evaluated, a future event 146 may be identified. Future event 146 may be identified and/or may be based on the evaluated text included in e-mail message 126. In a non-limiting example, future event 146 may be identified using evaluated text 144 of message body 142 in e-mail message 126. In this non-limiting example shown in FIG. 3, future event 146 may be identified as a team meeting about confidential project "X," based on evaluated text 144 in message body 142 that recites "meet with the team about confidential project 'X?'." In another non-limiting example, future event 146 may be identified using evaluated text of subject line 138 of e-mail message 126. In this non-limiting example, future event 146 may be identified as a team meeting about confidential project "X," based on evaluated the text in subject line 138 that recites "Project 'X' meeting next week."

In addition to identifying future event 146 using the evaluated text included in e-mail message 126, an expiration deadline 148 for future event 146 may be identified, determined, and/or generated as well. Expiration deadline 148 may be generated based on the evaluated text included in e-mail message 126 and/or identified future event 146. Continuing on the non-limiting example above, expiration deadline 148 for identified future event 146 (e.g., project "X" meeting) may be generated using or based on evaluated text 144 of message body 142 in e-mail message 126. In addition to text 144 of message body 142, expiration deadline 148 for identified future event 146 may be generated using current time-date indicator 110. In this non-limiting example, expiration deadline 148 for identified future event 146 may be generated as a time and date; 12:00 PM on Aug. 31, 2018. The generated time and date for expiration deadline 148 may be based on evaluated text 144 in message body 142 that recites "Please confirm by tomorrow (8/31) at noon."

Once future event 146 is identified and expiration deadline 148 is generated, it may be determined if generated expiration deadline 148 for future event 146 has lapsed, passed, and/or expired. Determining if expiration deadline 148 for identified future event 146 has lapsed may include analyzing and/or comparing information from a variety of sources within e-mail messaging application 112 and/or computing system (see, FIG. 28) utilizing e-mail messaging application 112. For example, determining if expiration deadline 148 for future event 146 has lapsed may include determining if a user of e-mail messaging application 112 responded to the received e-mail messages that are evaluated to identify future event 146 and generate expiration deadline 148. Additionally, or alternatively, determining if expiration deadline 148 for future event 146 has lapsed include can include comparing a time and date of the generated expiration deadline 148 with a current time and date (e.g., current time-date indicator 110).

Figure 4:
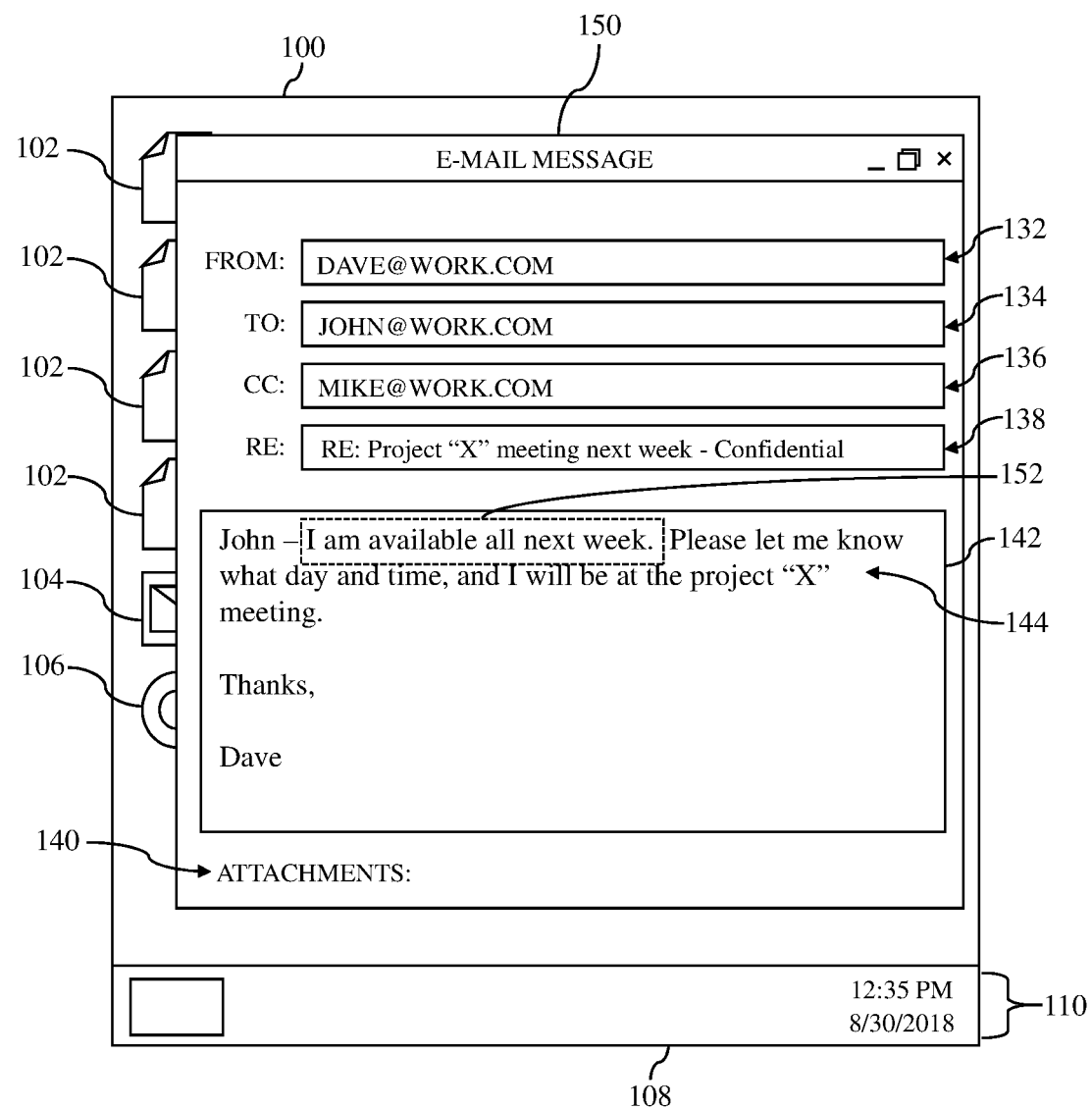
FIG. 4 depicts an illustrative front view of a response e-mail message to the e-mail message of FIG. 3, according to embodiments.

Turning to FIG. 4, a non-limiting example of a user's response e-mail message 150 to e-mail message 126. Similar to the e-mail message 126 of FIG. 3, the information or text included in response e-mail message 150 may be evaluated. For example, text 144 of message body 142 included in response e-mail message 150 may be evaluated to determine if expiration deadline 148 has lapsed. In the non-limiting example shown in FIG. 4, evaluation of response e-mail message 150 may determine that the user responded positively to e-mail message 126. More specifically, evaluating text 144 of response e-mail message 150 may determine and/or identify a positive response or confirmation text 152 (hereafter, "confirmation text 152") that the user is able to attend future event 146 based on the evaluated language of response e-mail message 150 that recites "I am available all next week."

In addition to identifying confirmation text 152 in response e-mail 150, determining if expiration deadline 148 for future event 146 has lapsed may also include comparing a time and date of the generated expiration deadline 148 with a current time and date (e.g., current time-date indicator 110). In the non-limiting example the current time and date may be the time and date in which response e-mail message 150 is drafted and/or sent back to the sender or sending source of e-mail message 126 (e.g., From-section 132 in e-mail message 126—FIG. 3; To-section 134 in response e-mail message 150—FIG. 4). As shown in FIG. 4, the current time and date of response e-mail message 150 may be identified as 12:35 PM on Aug. 30, 2018 (8/30/2018). As discussed herein with respect to FIG. 3, the expiration deadline 148 for future event 146 may be generated as 12:00 PM on Aug. 31, 2018. In comparing the current time and date of response e-mail message 150 and the generated time and date for expiration deadline 148, it may be determined that expiration deadline 148 has not lapsed and/or the current time and date has not passed or exceeded the generated time and date. Because the current time and date of response e-mail 150 has not passed or exceeded generated time and date for expiration deadline 148, and because the user responded positively in response e-mail message 150, then it may be determined that expiration deadline 148 for future event 146 has not lapsed.

In another non-limiting example (not shown), text of subject line 138 may be evaluated, and where the user of e-mail messaging application 112 inserts confirmation text 152 (e.g., "CONFIRMED") in subject line 138, it may be determined that expiration deadline 148 for future event 146 has not lapsed. The text of response e-mail message 150 may be evaluated and/or analyzed using any suitable natural language processing (NLP) techniques or protocol that may review, evaluate, analyze, and/or obtain information from the text and various portions of response e-mail message 150, as similarly discussed herein.

Figure 5:
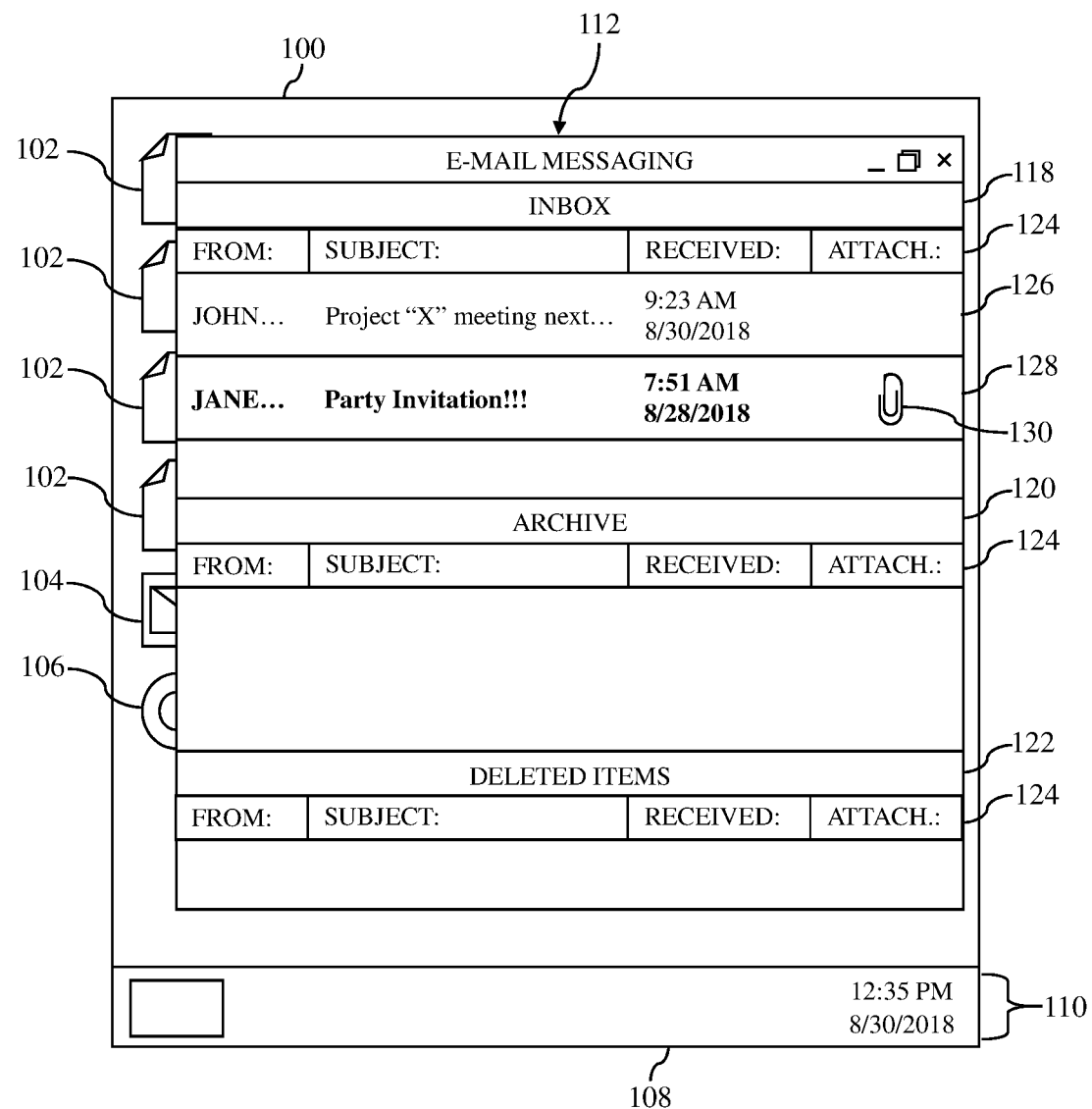
FIG. 5 depicts an illustrative front view of the inbox for the electronic mail messaging application, according to additional embodiments.

As a result of identifying confirmation text 152 in response e-mail message 150, and determining the current time and date of response e-mail message 150 is not past the generated time and date for expiration deadline 148, it may be determined that expiration deadline 148 for future event 146 has not lapsed. Additionally, and as a result of determining that expiration deadline 148 for future event 146 has not lapsed, the status of e-mail message 126 may be (at least partially) unchanged. For example, and as shown in FIG. 5, because it is determined that expiration deadline 148 for future event 146 has not lapsed, e-mail message 126 may remain in inbox 118 of e-mail messaging application 112. The text of e-mail message 126 may be changed (e.g., unbolded, non-bold, standard text) to indicate that e-mail message 126 has been previously read and/or responded too. However, because expiration deadline 148 for future event 146 has not lapsed, the status or location of e-mail message 126 may remain unchanged (e.g., remain in inbox 118).

Figure 6:
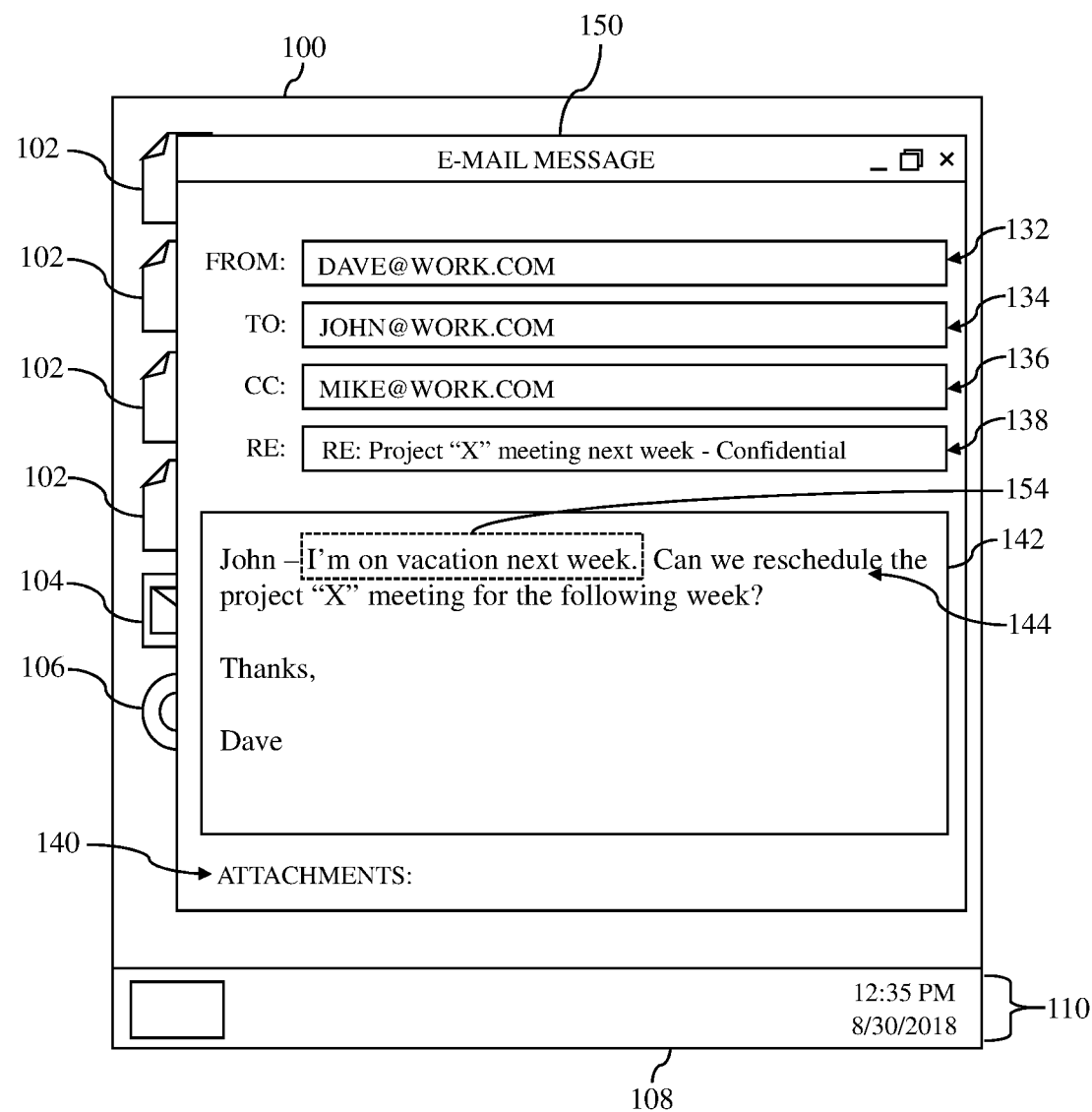
FIG. 6 depicts an illustrative front view of an alternative response e-mail message to the e-mail message of FIG. 3, according to another embodiment.

FIG. 6 shows another non-limiting example of user's response e-mail message 150 to e-mail message 126. Similar to the non-limiting example discussed herein with respect to FIG. 4, the information or text included in response e-mail message 150 may be evaluated. For example, text 144 of message body 142 included in response e-mail message 150 may be evaluated to determine if expiration deadline 148 has lapsed. In the non-limiting example shown in FIG. 6, and distinct from the non-limiting example of FIG. 4, evaluation of response e-mail message 150 may determine that the user responded negatively to e-mail message 126. More specifically, evaluating text 144 of response e-mail message 150 may determine and/or identify a negative response or rejection text 154 (hereafter, "rejection text 154") that the user is unable to attend future event 146 based on the evaluated language of response e-mail message 150 that recites "I'm on vacation next week."

Because rejection text 154 is identified in response e-mail message 150 shown in FIG. 6, it may be determined that generated expiration deadline 148 has lapsed. That is, identification of rejection text 154 may automatically determine and/or identify that generation expiration deadline 148 for future event 146 has lapsed. In this non-limiting example where response e-mail message 150 includes rejection text 154, it may be determined that generation expiration deadline 148 for future event 146 has lapsed independent of and/or regardless of the current time and date and the generated time and date for expiration deadline 148.

Figure 7:
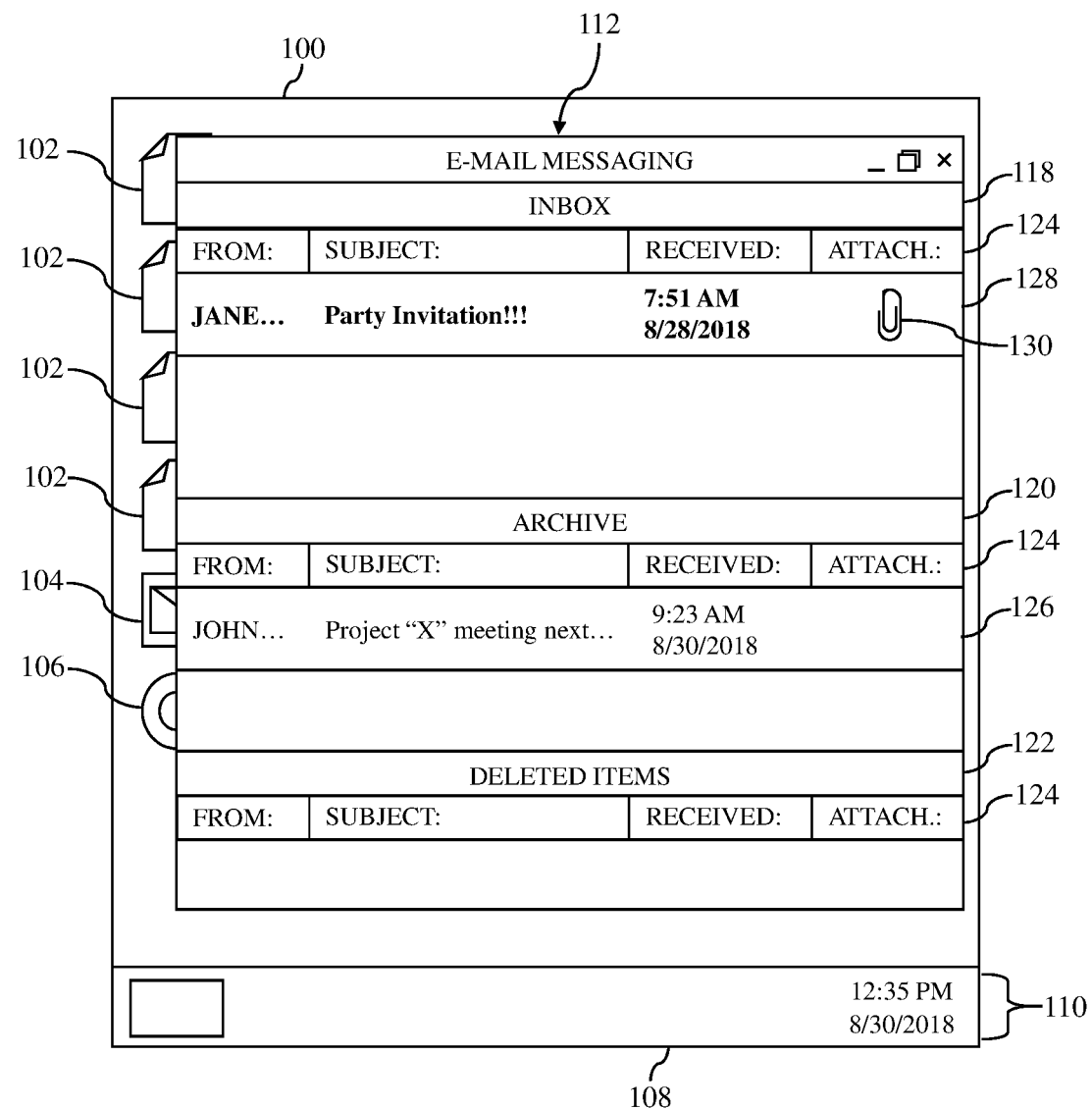
FIGS. 7-9 depict various illustrative front views of the inbox for the electronic mail messaging application after dynamically adjusting a status of the e-mail message of FIG. 3, according to various embodiments.

As a result of identifying rejection text 154 in response e-mail message 150, it may be determined that expiration deadline 148 for future event 146 has lapsed. As a result of determining that expiration deadline 148 for future event 146 has lapsed, the status of e-mail message 126 may be (at least partially) changed. For example, and as shown in FIG. 7, in response to determining that expiration deadline 148 for future event 146 has lapsed, the status of e-mail message 126 may be dynamically adjusted or changed. In the non-limiting example, e-mail message 126 may be dynamically and/or automatically moved from inbox 118 (see, FIG. 2) of e-mail messaging application 112 to archive 120 of e-mail messaging application 112. The dynamic and/or automatic adjustment or change in the status of e-mail message 126 may occur without the user's input and/or without the user physically moving e-mail message 126 from inbox 118 to archive 120. In a non-limiting example, as soon as rejection text 154 is identified in response e-mail message 150, the status of e-mail message 126 may be dynamically adjusted, and e-mail message 126 may be moved to archive 120. In other non-limiting examples discussed herein, the status of e-mail message 126 may be dynamically adjusted from inbox 118 to deleted items 122.

How the status of e-mail message 126 is dynamically adjusted (e.g., moved to archive 120) in response to determining expiration deadline 148 for future event 146 has lapsed may be dependent, at least in part on a predetermined set of rules or policies (hereafter, "predetermined policies"). The predetermined policies that influence how the status of e-mail messages (e.g., e-mail message 126) may be dynamically adjusted may be dependent on the e-mail message itself and/or e-mail messaging application 112. More specifically, predetermined policies may be based on e-mail message 126, evaluated text included in e-mail message 126, and/or information relating to e-mail messaging application 112 (e.g., personal e-mail account or public/free e-mail account). In non-limiting examples, once it is determined that generated expiration deadline 148 for future event 146 has lapsed based on the detection or identification of rejection text 154, the predetermined policies relating to e-mail message 126 may be analyzed to determine how the status of e-mail message 126 may be dynamically adjusted.

In the non-limiting examples discussed herein, from-section 132 and/or to-section 134 of e-mail message 126 (see, FIG. 3) and/or response e-mail message 150 (see, FIG. 6) may be evaluated to determine that the user of e-mail messaging application 112 is using their work e-mail (e.g., DAVE@WORK.COM) and/or communicating with co-workers (e.g., JOHN@WORK.COM). Predetermined policies associated with e-mail messages (e.g., e-mail message 126, response e-mail message 150) relating to the user's work (e.g., work e-mail, communications with co-workers) may automatically archive, rather than delete the associated e-mail messages. As such, the status of e-mail message 126 is dynamically adjusted in accordance with the predetermined policies relating to e-mail message 126. That is, and as shown in the non-limiting example of FIGS. 6 and 7, once it is determined that expiration deadline 148 for future event 146 has lapsed, that status of e-mail message 126 may be dynamically adjusted from inbox 118 to archive 120 in accordance with the analyzed, predetermined policies associated with e-mail message 126.

Figure 8:
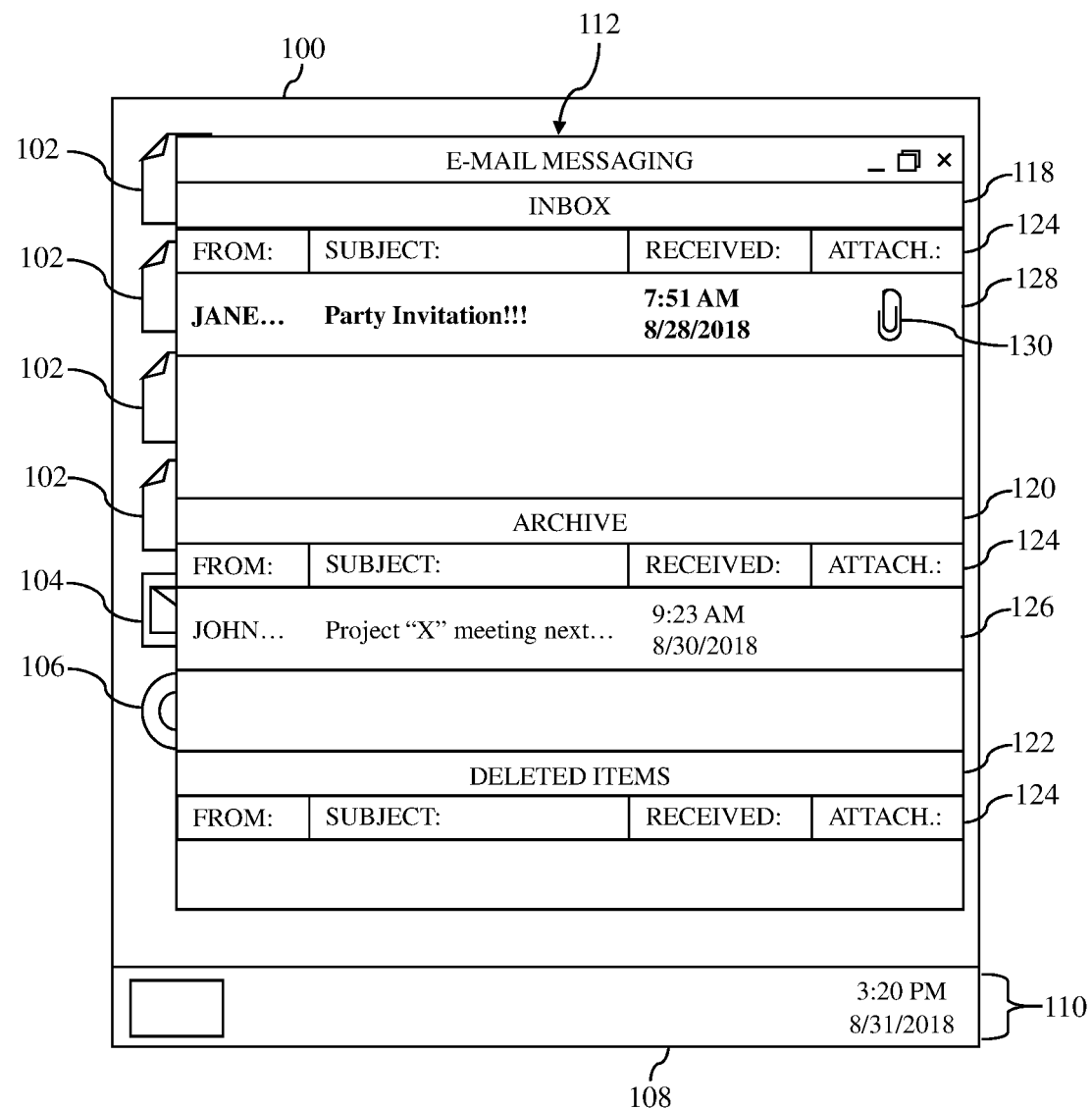
Figure 9:
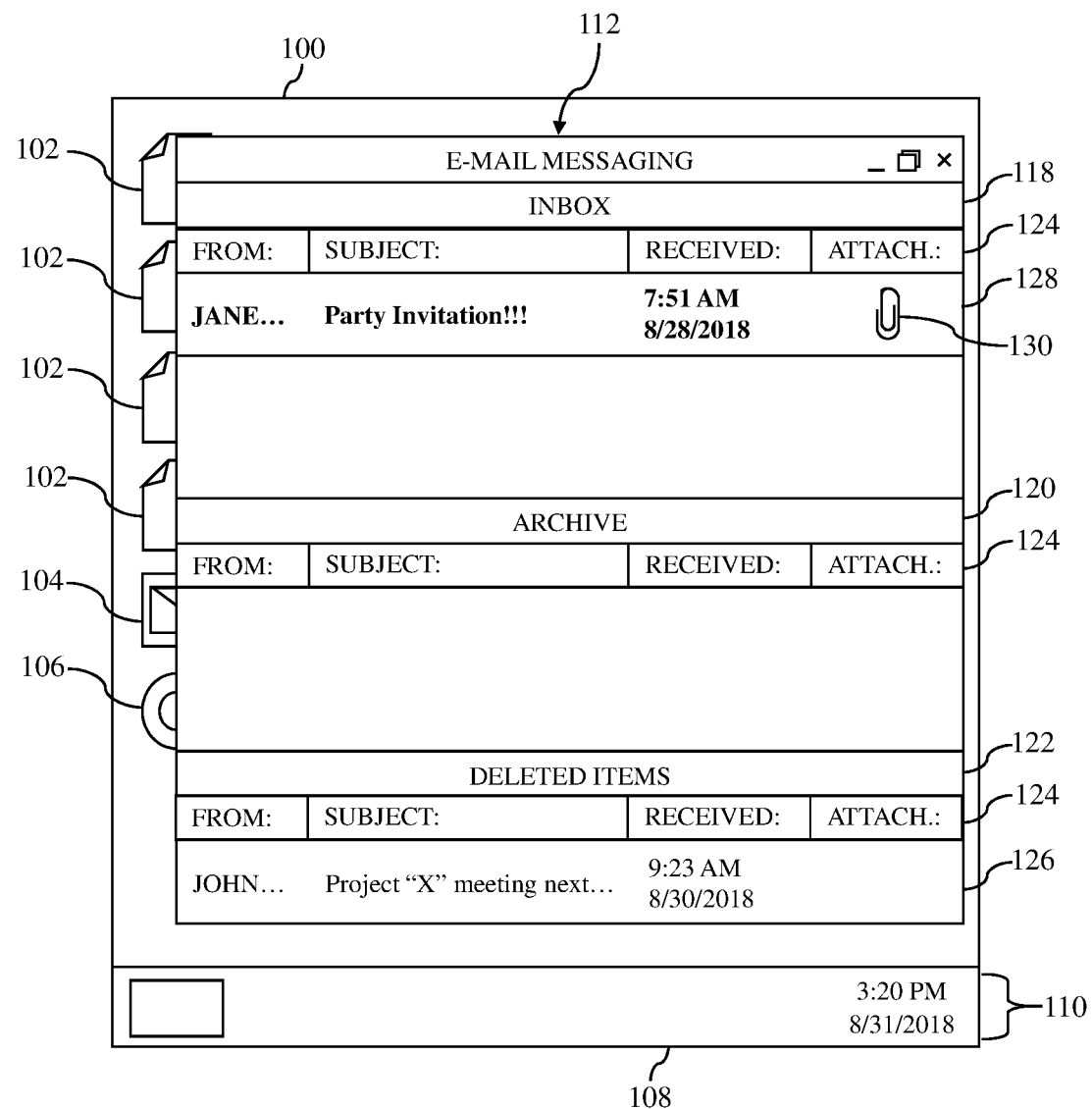

FIGS. 8 and 9 shows additional non-limiting examples of e-mail messaging application 112. The non-limiting examples shown in FIGS. 8 and 9 may include when the user of e-mail messaging application 112 doesn't open and/or read e-mail message 126 (e.g., remains bolded). More specifically in the non-limiting examples, user of e-mail messaging application 112 may not open or read e-mail message 126 by generated expiration deadline 148 for identified future event 146. As previously discussed herein, determining if expiration deadline 148 for future even 146 has lapsed may include comparing a time and date of the generated expiration deadline 148 with a current time and date (e.g., current time-date indicator 110). As shown in FIGS. 8 and 9, the current time and date may be identified as 3:20 PM on Aug. 31, 2018 (8/31/2018). As discussed herein with respect to FIG. 3, the expiration deadline 148 for future event 146 identified in e-mail message 126 may be generated as 12:00 PM on Aug. 31, 2018. In comparing the current time and date and the generated time and date for expiration deadline 148, it may be determined that expiration deadline 148 has lapsed and/or the current time and date has passed and/or exceeded the generated time and date associated with expiration deadline 148. Because the current time and date has passed or exceeded generated time and date for expiration deadline 148, it may be determined that expiration deadline 148 for future event 146 has lapsed. Similar to the non-limiting example discussed herein with respect to FIGS. 6 and 7, once it is determined that expiration deadline 148 has lapsed, the status of e-mail message 126 may be (at least partially) dynamically adjusted. For example, and as shown in FIG. 8, in response to determining that expiration deadline 148 for future event 146 has lapsed, e-mail message 126 may be dynamically and/or automatically moved from inbox 118 (see, FIG. 2) of e-mail messaging application 112 to archive 120 (see, FIG. 8) or deleted items 122 (see, FIG. 9) of e-mail messaging application 112. Because the user of e-mail messaging application 112 did not open or read e-mail message 126, the text of e-mail message 126 may remain bolded in e-mail messaging application 112.

FIGS. 10-17 show additional, non-limiting examples of dynamically managing e-mail messages using e-mail messaging application 112. More specifically, FIGS. 10-17 show non-limiting examples of dynamically managing e-mail messages at a later date and/or time (e.g., 4:24 PM on Sep. 4, 2018 (9/4/2018)) than e-mail message 126 as discussed in FIGS. 2-9. It is understood that similarly numbered and/or named components may function in a substantially similar fashion. Redundant explanation of these components has been omitted for clarity.

Figure 10:
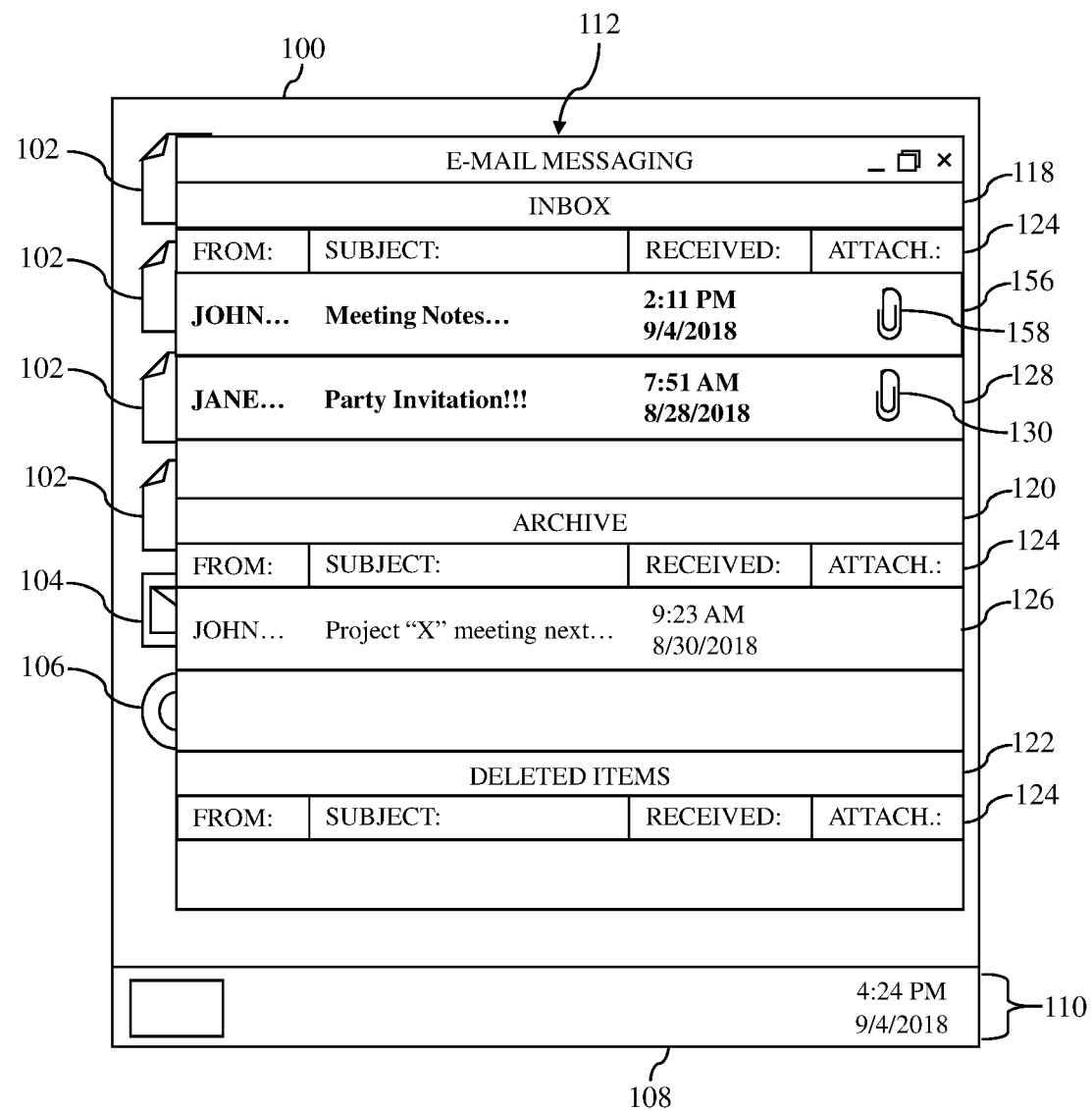
FIG. 10 depicts an illustrative front view of the inbox for the e-mail messaging application, according to additional embodiments.

As shown in FIG. 10, e-mail messaging application 112 may include e-mail message 156 in inbox 118. E-mail message 156 may be received by the user on Sep. 4, 2018 (9/4/2018) at 2:11 PM. That is, e-mail message 156 may be sent to the user of e-mail messaging application 112 at 2:11 PM on Sep. 4, 2018 (9/4/2018). In the non-limiting example, e-mail message 156 may also include attachment symbol 158. Attachment symbol 158 may be substantially similar to attachment symbol 130 of e-mail message 128 discussed herein with respect to FIG. 2. Specifically, attachment symbol 158 of e-mail message 156 may notify the user of e-mail messaging application 112 that e-mail message 156 includes an attachment (e.g., document, file, program, photo, and so on).

Figure 11:
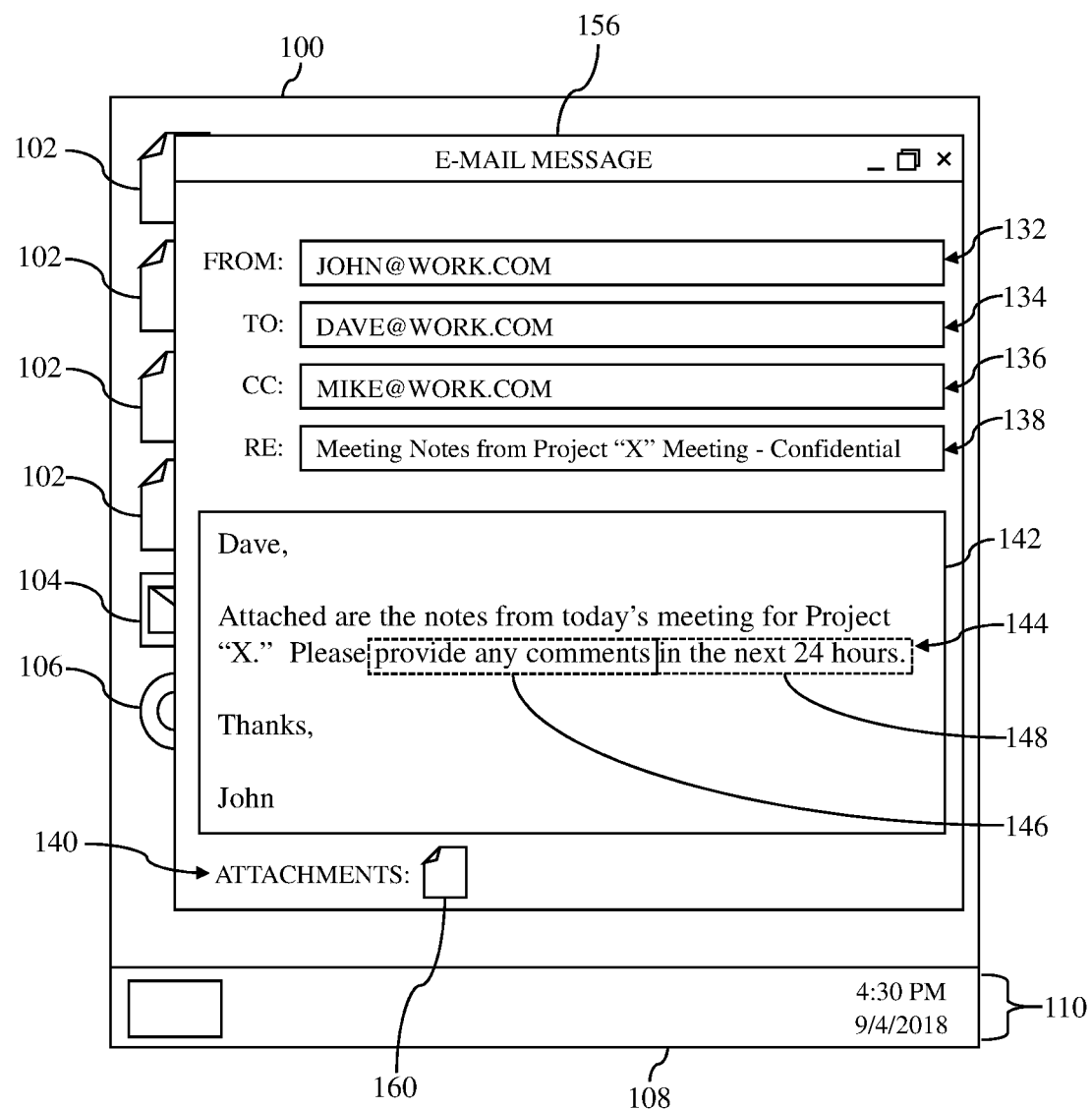
FIG. 11 depicts an illustrative front view of an e-mail message included in the inbox for the e-mail messaging application of FIG. 10, according to additional embodiments.

With continued reference to FIG. 10, FIG. 11 shows a front view of e-mail message 156 included in inbox 118 for e-mail messaging application 112. As discussed herein, e-mail message 156 may include attachment 160, as previously indicated and/or identified using attachment symbol 158 (see, FIG. 10). As shown in FIG. 11, attachment 160 included in and/or with e-mail message 156 may be displayed in attachment section 140. More specifically, an interactive-graphic representation of attachment 160 may be displayed in attachment section 140 of e-mail message 156. In the non-limiting example shown in FIG. 11, attachment 160 included in and/or with e-mail message 156 may include a text document that includes "meeting notes" sent by the sender (e.g., "JOHN@WORK.COM") of e-mail message 156.

E-mail message 156 may be dynamically managed using similar processes and/or steps as similarly discussed herein with respect to FIG. 3. For example, and continuing the example discussed above, the text and/or attachments of e-mail message 156 is evaluated and/or analyzed (using NLP protocol(s)) to identify future event 146, and generate expiration deadline 148 for future event 146. In the non-limiting example shown in FIG. 11, evaluating text 144 of message body 142 included in e-mail message 156 may determine and/or identify future event 146 as a request to provide comments on the meeting notes and/or project "X." This may be based on evaluated text 144 in message body 142 that recites "provide any comments." Additionally, evaluating text 144 of message body 142 included in e-mail message 156 may determine and/or allow for the generation of expiration deadline 148 for future event 146. Expiration deadline 148 for identified future event 146 (e.g., provide comments) may be generated using or based on evaluated text 144 of message body 142 in e-mail message 156 that recites "in the next 24 hours." In one non-limiting example, the generated 24-hour expiration deadline 148 may be based on when e-mail message 156 was initially sent to the user of e-mail messaging application 112. As such, generated expiration deadline 148 for future event 146 identified in e-mail message 156 may be 24 hours from 2:11 PM on Sep. 4, 2018 (9/4/2018) (see, FIG. 10), or 2:11 PM on Sep. 5, 2018 (9/5/2018). In another non-limiting example, the generated 24-hour expiration deadline 148 may be based on when e-mail message 156 was opened by the user of e-mail messaging application 112. As shown in FIG. 11, generated expiration deadline 148 for future event 146 identified in e-mail message 156 may be 24 hours from 4:30 PM on Sep. 4, 2018 (9/4/2018), or 4:30 PM on Sep. 5, 2018 (9/5/2018).

Figure 12:
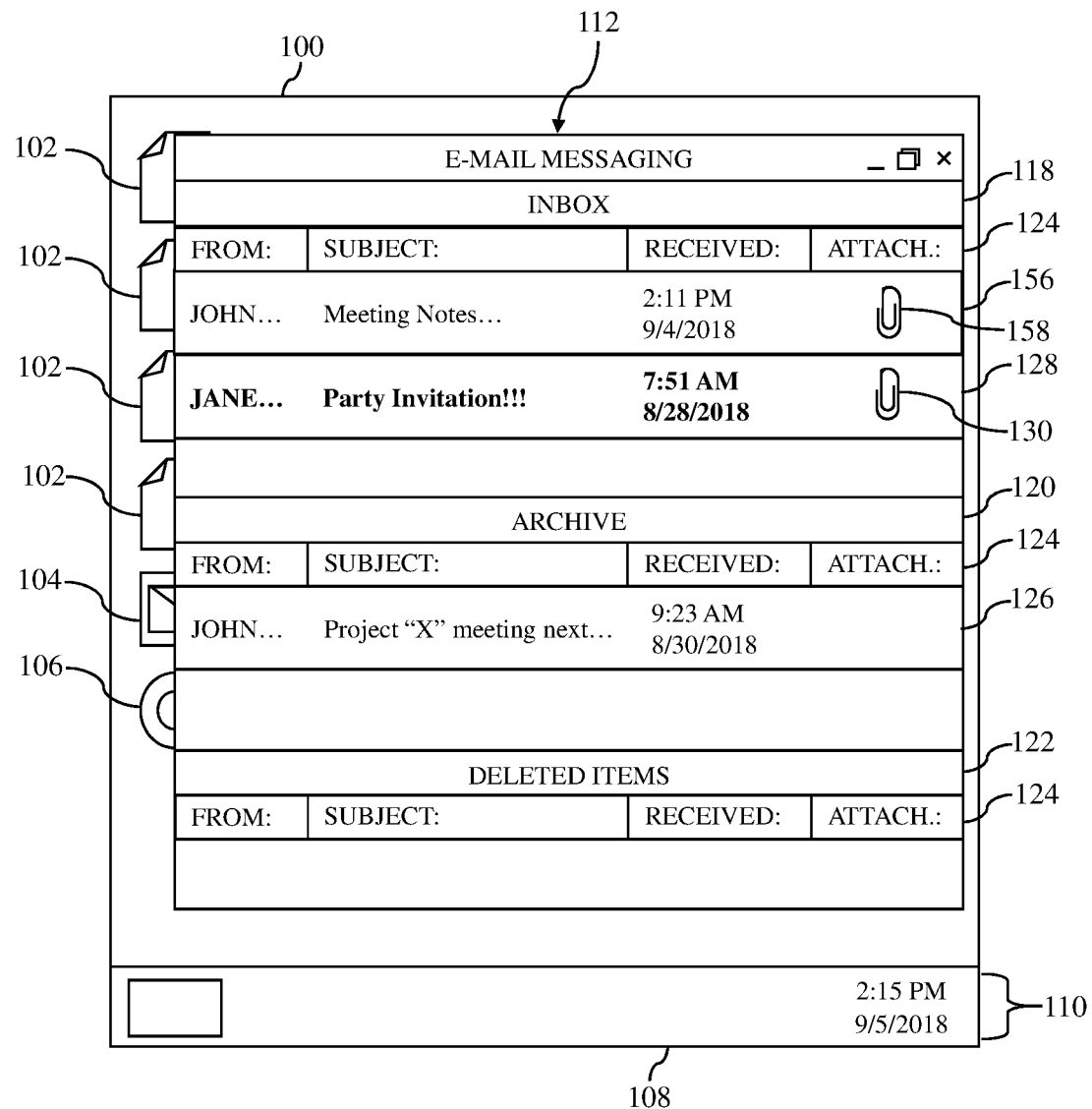
FIGS. 12-14 depict various illustrative front views of the inbox for the electronic mail messaging application after dynamically adjusting a status of the e-mail message of FIG. 11, according to additional embodiments.

FIG. 12 shows e-mail messaging application 112 at a later time and date then as shown in FIG. 10. More specifically, FIG. 12 shows e-mail messaging application 112 more than 24 hours after e-mail message 156 was sent to the user of e-mail messaging application 112, and included in inbox 118. Continuing the non-limiting example above where generated expiration deadline 148 for future event 146 (e.g., provide comments) is based on the time and date in which e-mail message 156 was sent (see, FIG. 10), e-mail message 156 may remain in inbox 118 of e-mail messaging application 112 after the lapse of expiration deadline 148 (e.g., 2:11 PM on Sep. 5, 2018 (9/5/2018)). In a non-limiting example, the status of e-mail message 156 may be unchanged and/or may remain in inbox 118 as a result of the user responding (not shown) to e-mail message 156 before the lapse of generated expiration deadline 148. In this non-limiting example, e-mail message 156 may remain in inbox 118 and attachment 160 (see, FIG. 11) may remain with and/or may still be accessible through e-mail message 156 (see, FIG. 11). To indicate that attachment 160 is still accessible through e-mail message 156, e-mail message 156 included in inbox 118 in e-mail messaging application 112 may still include attachment symbol 158. Additionally, and as similarly discussed herein with respect to FIGS. 4 and 5, the text of e-mail message 156 may be changed (e.g., unbolded, non-bold, standard text) to indicate that e-mail message 156 has been previously read and/or responded too.

Figure 13:
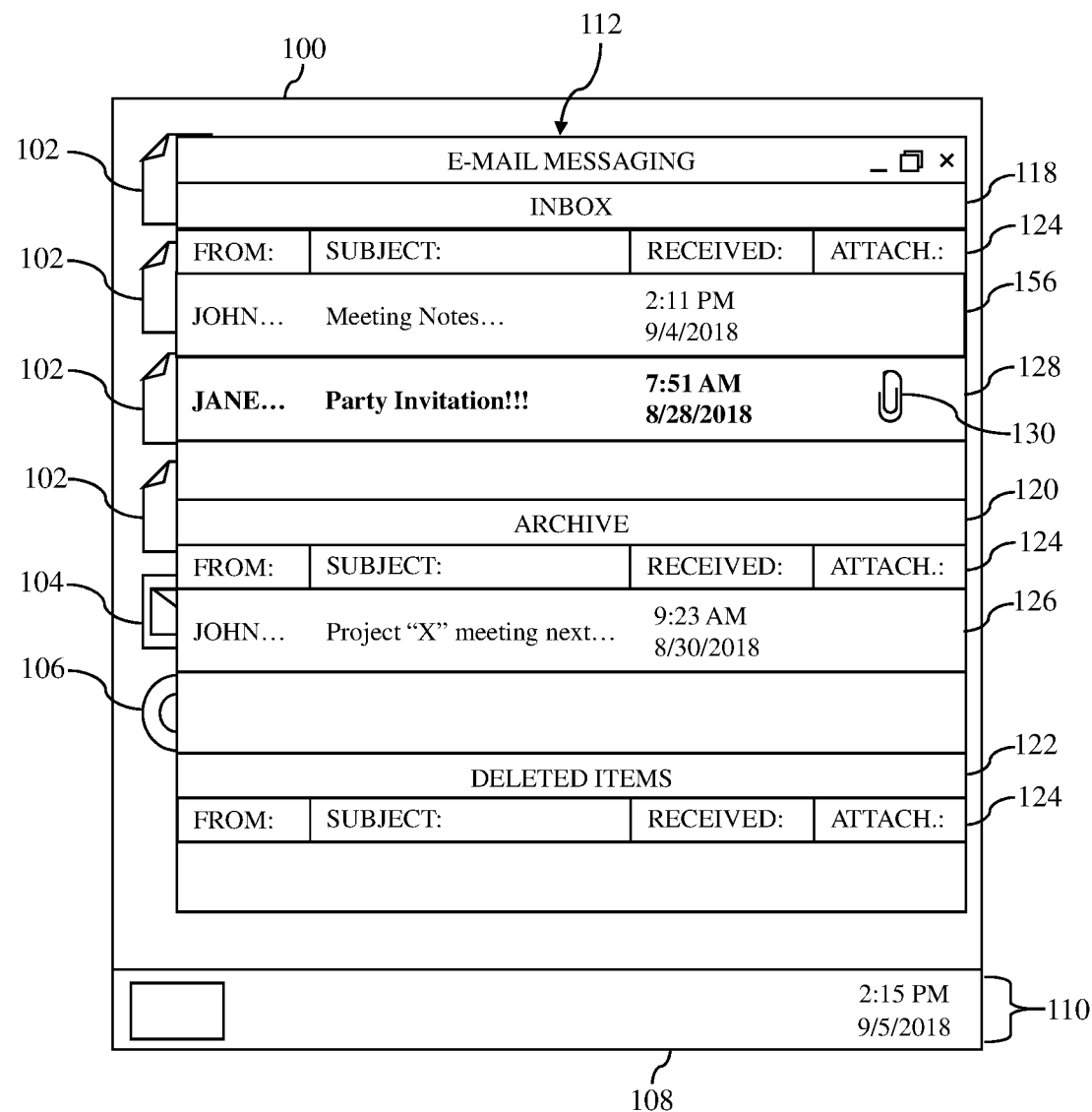
Figure 14:
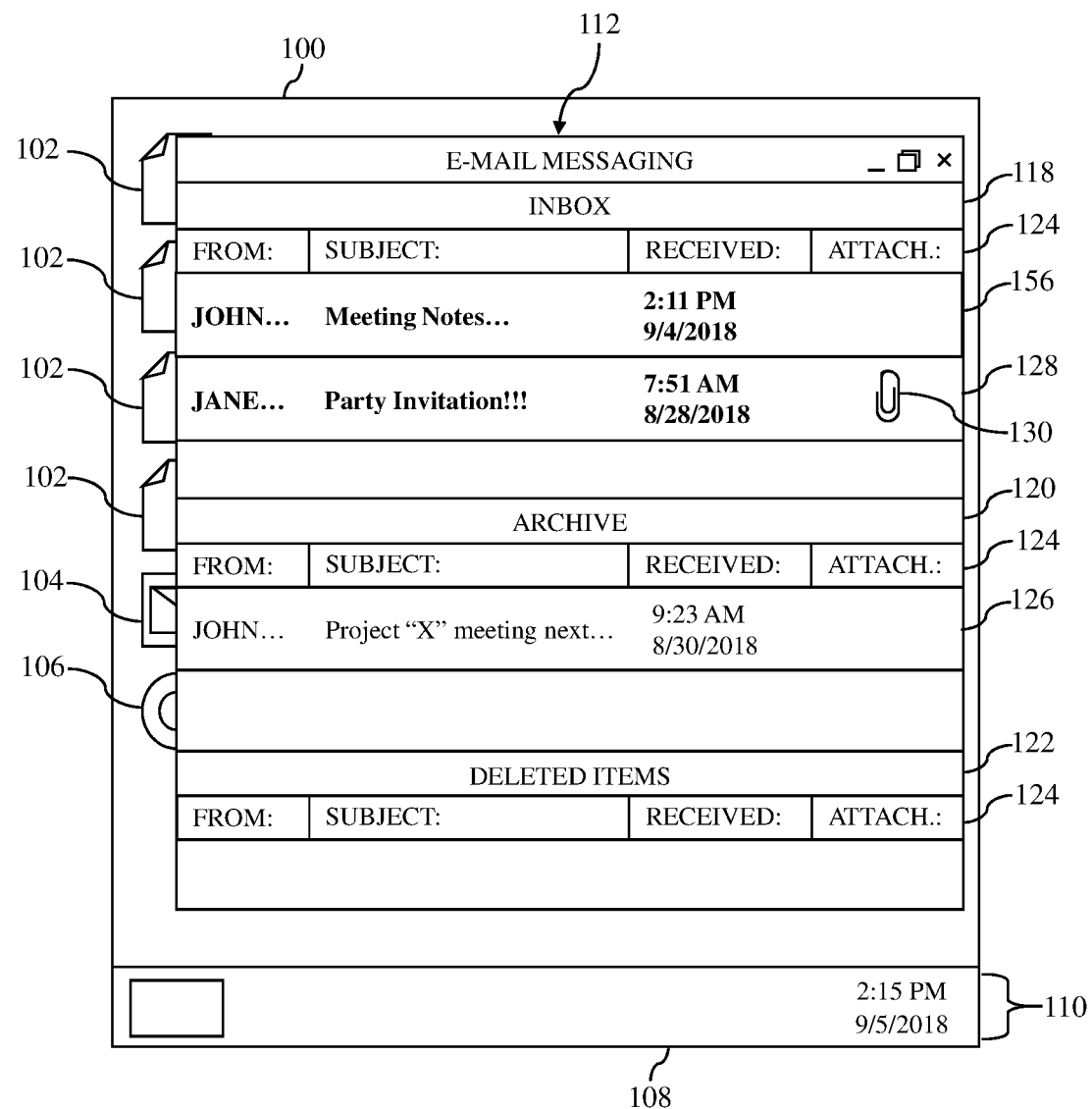

FIGS. 13 and 14 shows additional non-limiting examples of e-mail messaging application 112 more than 24 hours after e-mail message 156 was sent to the user of e-mail messaging application 112, and included in inbox 118. In one non-limiting example shown in FIG. 13, and similar to the non-limiting example discussed herein with respect to FIG. 12, the status of e-mail message 156 may be unchanged and/or may remain in inbox 118 as a result of the user responding (not shown) to e-mail message 156 before the lapse of generated expiration deadline 148. Additionally, and as similarly discussed herein, the text of e-mail message 156 may be changed (e.g., unbolded, non-bold, standard text) to indicate that e-mail message 156 has been previously read and/or responded too.

However, distinct from the non-limiting example of FIG. 12, the status of e-mail message 156 may be dynamically adjusted as a result of determining generated expiration deadline 148 (e.g., 2:11 PM on Sep. 5, 2018 (9/5/2018)) for identified future event 146 (e.g., provide comments) has lapsed. That is, and distinct from the non-limiting example of FIG. 12, once it is determined that expiration deadline 148 for identified future event 146 has lapsed, the status of e-mail 156 may be dynamically adjusted by removing and/or automatically deleting attachment 160 (see, FIG. 11) included with e-mail message 156. As a result of dynamically adjusting the status of e-mail message 156 and/or automatically deleting attachment 160, e-mail message 156 may no longer include and/or provide access to attachment 160 when opened and/or viewed, as discussed herein. Additionally as shown in FIG. 13, the status of e-mail message 156 may also be dynamically adjusted by removing attachment symbol 158 from being displayed with e-mail message 156 in inbox 118 of e-mail messaging application 112. The removal of attachment symbol 158 may further indicate that attachment 160 has been removed and/or automatically deleted from e-mail message 156, and/or e-mail message 156 may no longer include and/or provide access to attachment 160 when opened and/or viewed, as discussed herein.

In another non-limiting example, and with continued reference to FIG. 13, the status of e-mail message 156 may be dynamically adjusted as a result of determining that the user of e-mail messaging application 112 reads or opens e-mail message 156, but does not respond. That is in the additional non-limiting, attachment 160 may be removed and/or automatically deleted from e-mail message 156 (e.g., status dynamically adjusted) as a result of determining that the user of e-mail messaging application 112 does not meet their obligations/requests of the future event 146 by the generated expiration deadline 148. For example, the status of e-mail message 156 may be dynamically adjusted as a result of the user of e-mail messaging application 112 not providing the request comments (e.g., future event 146) within 24 hours of the e-mail (e.g., expiration deadline 148). As such, the status of e-mail 156 may be dynamically adjusted by removing and/or automatically deleting attachment 160 (see, FIG. 11) included with e-mail message 156, as well as removing attachment symbol 158 from being displayed with e-mail message 156 in inbox 118 of e-mail messaging application 112.

The non-limiting example shown in FIG. 14 may depict when the user of e-mail messaging application 112 does not open e-mail message 156. Specifically, and continuing the examples above, FIG. 14 shows e-mail messaging application 112 after the expiration deadline 148 for future event 146 has lapsed, and where the user of e-mail messaging application 112 has not responded to or even opened e-mail message 156. Similar to the non-limiting example discussed herein with respect to FIG. 13, in response to determining generated expiration deadline 148 has lapsed, and determining the user has not responded to e-mail message 156 and/or meet their obligations/requests of the future event 146, the status of e-mail message 156 may be dynamically adjusted. For example, the status of e-mail message 156 may be dynamically adjusted by removing and/or automatically deleting attachment 160 (see, FIG. 11) included with e-mail message 156, as well as removing attachment symbol 158 from being displayed with e-mail message 156 in inbox 118 of e-mail messaging application 112. Additionally, and because the user of e-mail messaging application 112 did not open or read e-mail message 156, the text of e-mail message 156 may remain bolded in e-mail messaging application 112.

Figure 15:
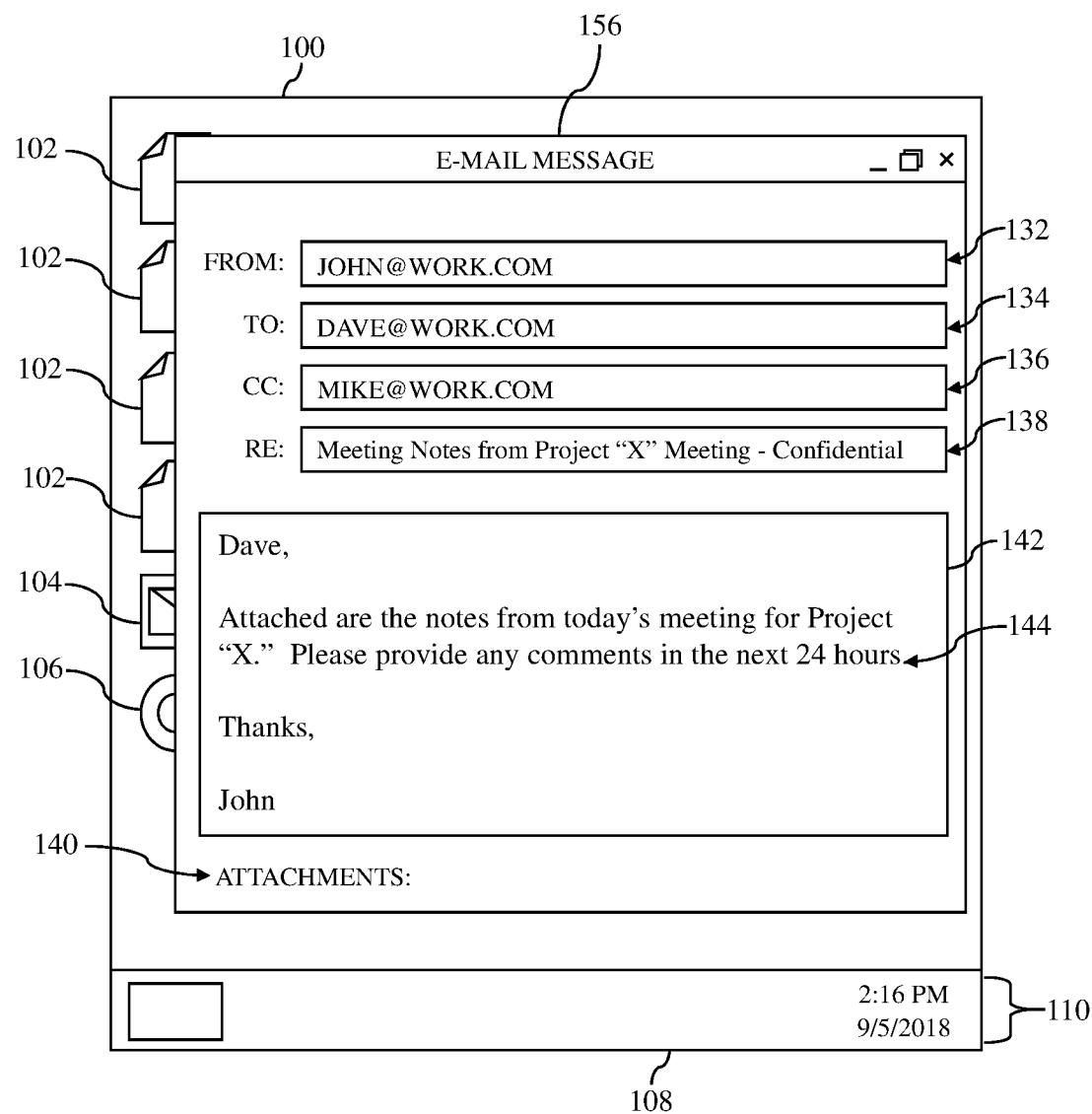
FIG. 15 depicts an illustrative front view of the e-mail message included in the inbox for the e-mail messaging application of FIG. 14, according to additional embodiments.

FIG. 15 shows a non-limiting example of e-mail message 156 more than 24 hours after e-mail message 156 was sent to the user of e-mail messaging application 112 (e.g., 2:16 PM on Sep. 5, 2018 (9/5/2018)). Specifically, FIG. 15 shows a non-limiting example of opened e-mail message 156 after expiration deadline 148 has lapsed (see, FIG. 13), after the user of e-mail messaging application 112 does not respond to e-mail message 156 (see, FIG. 13), and/or after the user e-mail messaging application 112 does not open e-mail message 156 (see, FIG. 14). As a result of determining that expiration deadline 148 has lapsed, and as discussed herein, the status of e-mail message 156 may be dynamically adjusted by removing and/or automatically deleting attachment 160 (see, FIG. 11). With comparison to FIG. 11, attachment 160 and/or the interactive-graphic representation of the attachment may no longer be included in and/or may be deleted from attachment section 140 of e-mail message 156.

Figure 16:
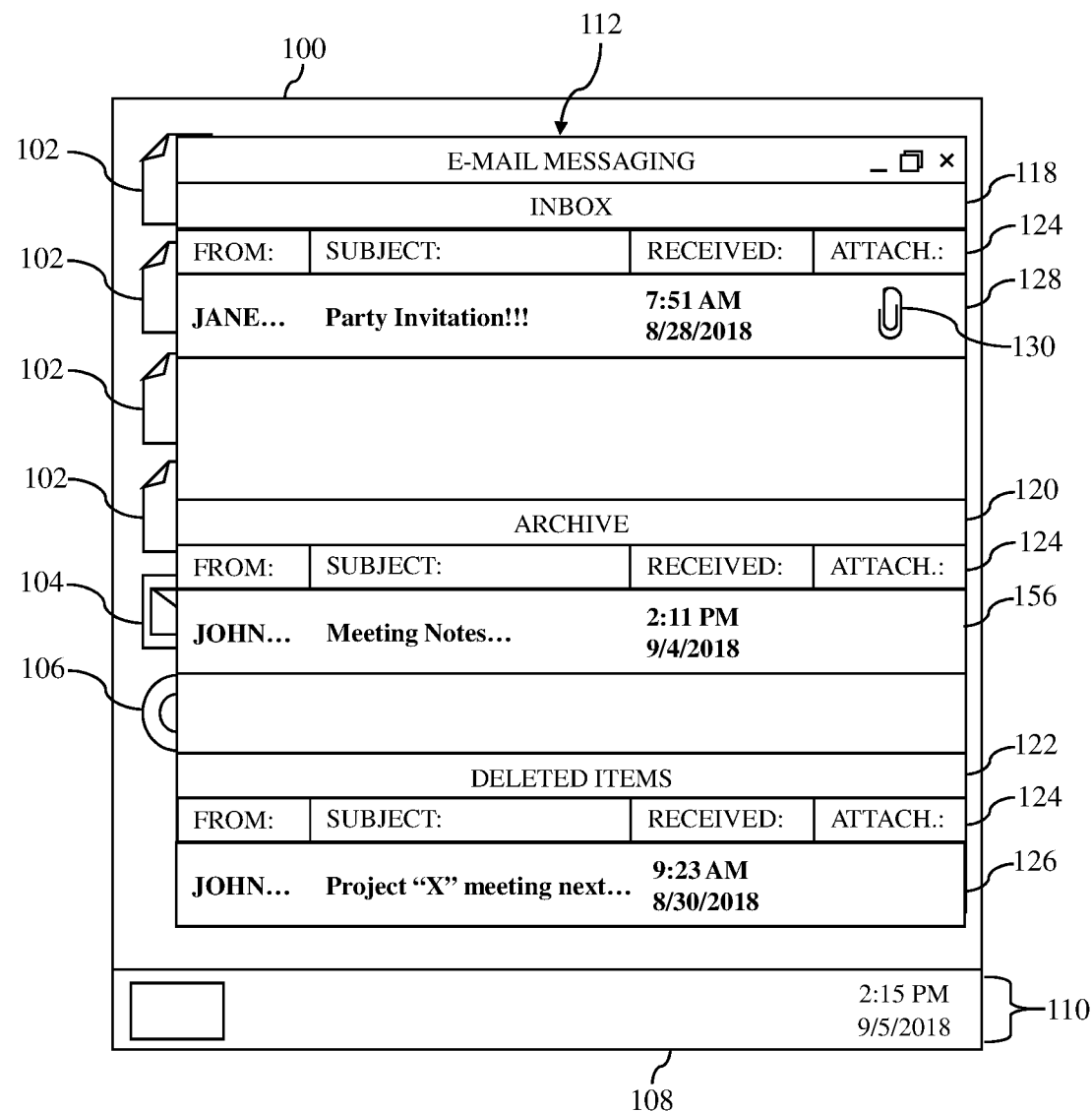
FIGS. 16 and 17 depict various illustrative front views of the inbox for the electronic mail messaging application after dynamically adjusting a status of the e-mail message of FIG. 11, according to additional embodiments.
Figure 17:
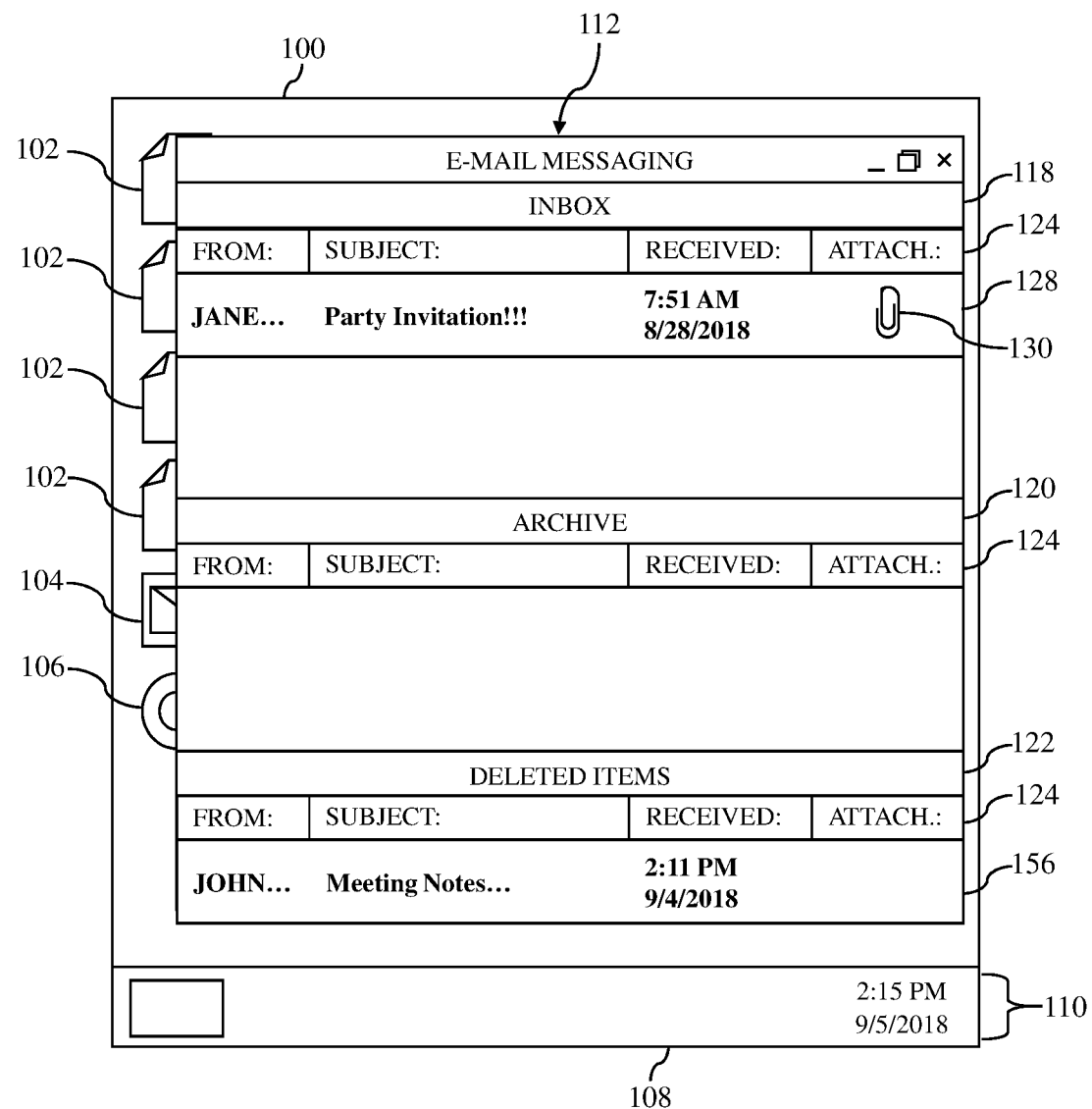

FIGS. 16 and 17 shows additional non-limiting examples of e-mail messaging application 112. Similar to FIGS. 8 and 9, the non-limiting examples shown in FIGS. 16 and 17 may include additional non-limiting examples when the user of e-mail messaging application 112 doesn't open and/or read e-mail message 156 (e.g., remains bolded). More specifically in the non-limiting examples, user of e-mail messaging application 112 may not open or read e-mail message 156 by generated expiration deadline 148 for identified future event 146. As discussed herein, and in response to determining that expiration deadline 148 for future event 146 has lapsed, the status of e-mail message 156 may be dynamically adjusted. For example, the status of e-mail message 156 may be dynamically adjusted such that e-mail message 156 is automatically moved from inbox 118 (see, FIG. 10) of e-mail messaging application 112 to archive 120 (see, FIG. 16) or deleted items 122 (see, FIG. 17) of e-mail messaging application 112. Additionally, and similar to the non-limiting examples discussed herein with respect to FIGS. 13 and 14, the status of e-mail message 156 may also be dynamically adjusted by removing and/or automatically deleting attachment 160 (see, FIG. 11) included with e-mail message 156, as well as removing attachment symbol 158 from being displayed with e-mail message 156 in inbox 118 of e-mail messaging application 112 (see, FIGS. 16 and 17). Because the user did not open or read e-mail message 156, the text of e-mail message 156 shown in e-mail messaging application 112 may remain bolded, as discussed herein.

FIGS. 18-26 show additional, non-limiting examples of dynamically managing e-mail messages using e-mail messaging application 112. More specifically, FIGS. 18-26 show non-limiting examples of dynamically managing e-mail messages at additional later dates and/or times then discussed herein with reference to FIGS. 2-17. It is understood that similarly numbered and/or named components may function in a substantially similar fashion. Redundant explanation of these components has been omitted for clarity.

Figure 18:
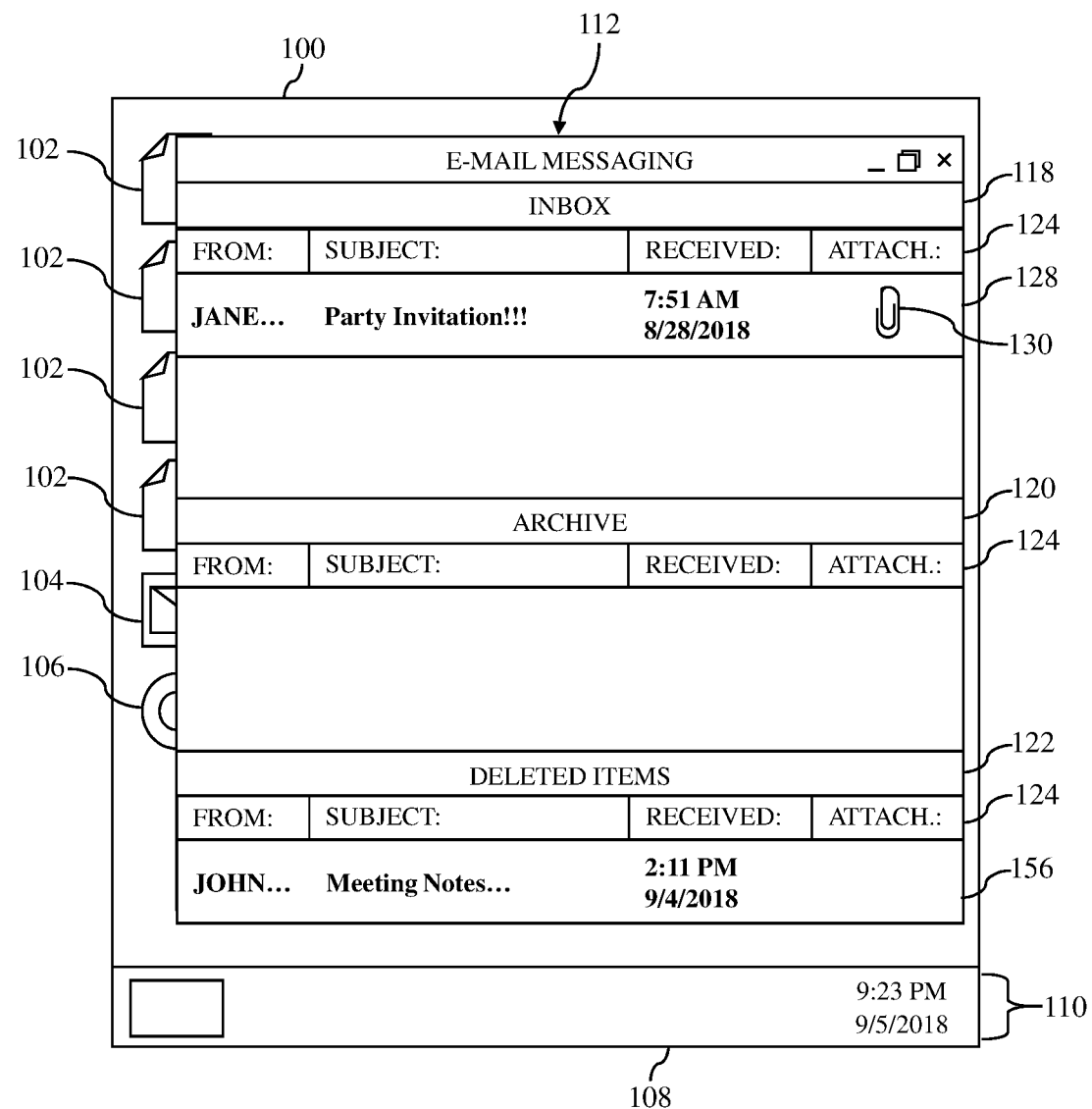
FIG. 18 depicts an illustrative front view of the inbox for the e-mail messaging application, according to further embodiments.

As shown in FIG. 18, e-mail messaging application 112 may still include unread, e-mail message 128 in inbox 118 (see also, FIG. 2). As discussed herein, e-mail message 128 may include attachment symbol 130 indicating and/or notifying the user of e-mail messaging application 112 that e-mail message 128 includes an attachment (e.g., document, file, program, photo, and so on). Additionally in the non-limiting example, e-mail messaging application 112 may include e-mail message 156 included in deleted items 122, similar to the non-limiting example discussed herein with respect to FIG. 17.

With continued reference to FIG. 18, FIG. 19 shows a front view of e-mail message 128 included in inbox 118 for e-mail messaging application 112. As discussed herein, e-mail message 128 may include attachment 162, as previously indicated and/or identified using attachment symbol 130 (see, FIG. 18). As shown in FIG. 19, an interactive-graphic representation of attachment 162 may be displayed in attachment section 140 of e-mail message 128. In the non-limiting example shown in FIG. 19, attachment 162 included in and/or with e-mail message 128 may include a word document that include a "party invitation" sent by the sender (e.g., "JANE@MAIL.COM") of e-mail message 128.

E-mail message 128 may be dynamically managed using similar processes and/or steps as similarly discussed herein. For example, and continuing the example discussed above, the text and/or attachments of e-mail message 128 is evaluated and/or analyzed (using NLP protocol(s)) to identify future event 146, and generate expiration deadline 148 for future event 146. In the non-limiting example shown in FIG. 19, and distinct from the non-limiting examples discussed herein, evaluating e-mail message 128, and the text or information included therein, may not allow for future event 146 to be (completely identified), and/or for expiration deadline 148 to be generated. For example, evaluating and/or analyzing e-mail message 128 may only partially identify future even 146 as a "party," based on the text that says "Party Invitation" (e.g., subject line 138) and/or "Nolan's Party" (e.g., text 144 of message body 142). However, the text in e-mail message 128 does not include a date, time, or place for the "party," nor is there any text (e.g., RSVP date) that would be analyzed and/or evaluated to generate expiration deadline 148. As such, attachment 162, and more specifically the text included within attachment 162, in e-mail message 128 may be evaluated and/or analyzed.

Figure 20:
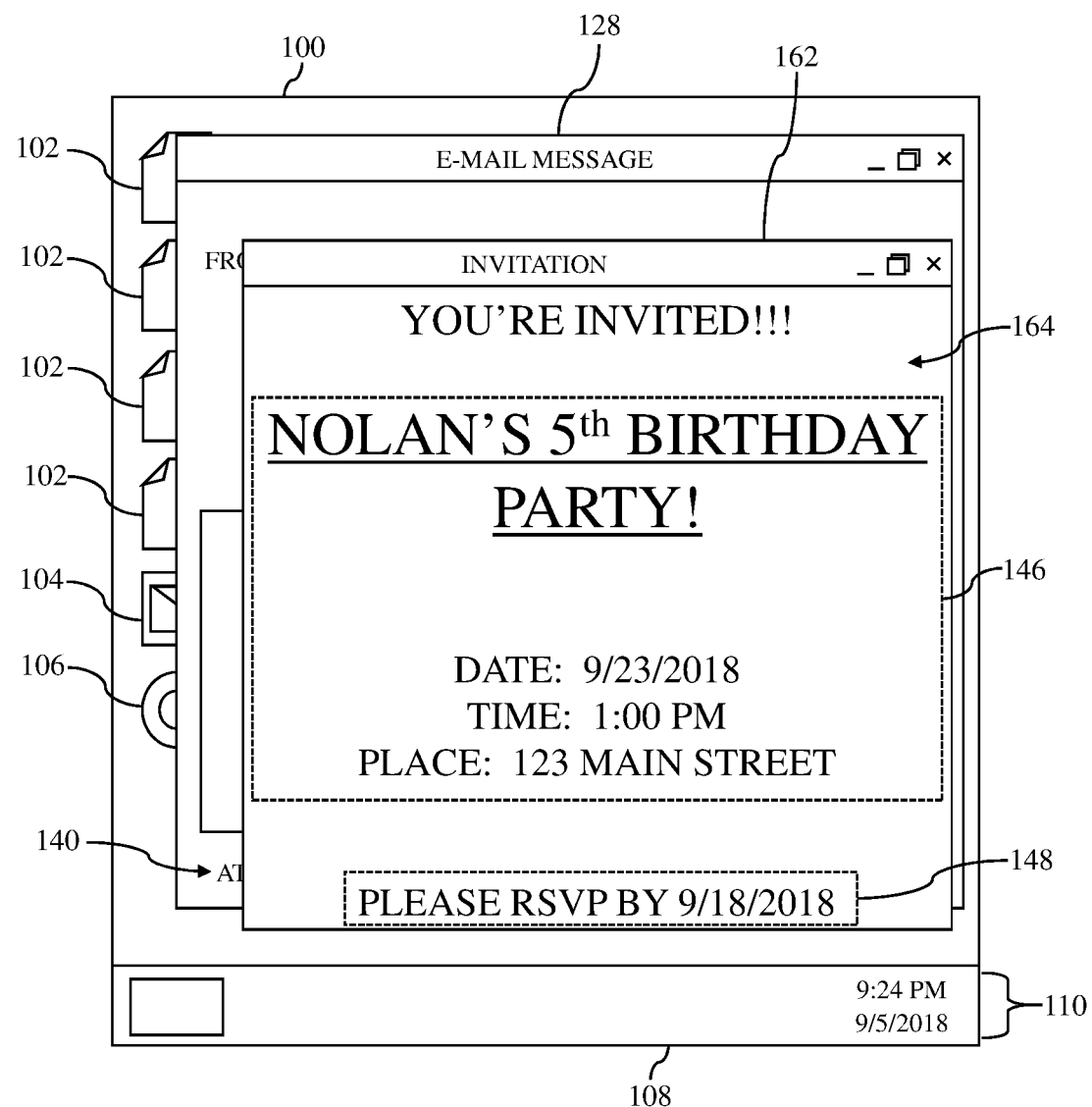
FIG. 20 depicts an illustrative front view of an attachment included with the e-mail message of FIG. 19, according to further embodiments.

Turning to FIG. 20, a view of attachment 162 included with e-mail message 128 is shown. Attachment 162 may be opened and/or may become visible to the user of e-mail messaging application 112 after the user engages (e.g., clicks or opens) attachment 162 displayed in attachment section 140 of e-mail message 128. In the non-limiting example shown in FIG. 20, attachment 162 may be a text document that includes information and/or text 164 (hereafter, "text 164") relating to the "party." Evaluating and/or analyzing text 164, using NLP protocol(s) as discussed herein, may determine and/or identify future event 146 as "Nolan's $5^{th}$ birthday party," with a defined date (e.g., 9/23/2018), time (e.g., 1:00 PM), and location (e.g., 123 Main street). Additionally, evaluating text 164 of attachment 162 included in e-mail message 128 may determine and/or allow for the generation of expiration deadline 148 for future event 146. Expiration deadline 148 for identified future event 146 (e.g., Nolan's party) may be generated using or based on evaluated text 164 of attachment 162 in e-mail message 128 that recites "RSVP by 9/18/2018." As such, generated expiration deadline 148 for future event 146 identified in e-mail message 128 may be Sep. 18, 2018 (9/18/2018) at 11:59 PM.

Figure 21:
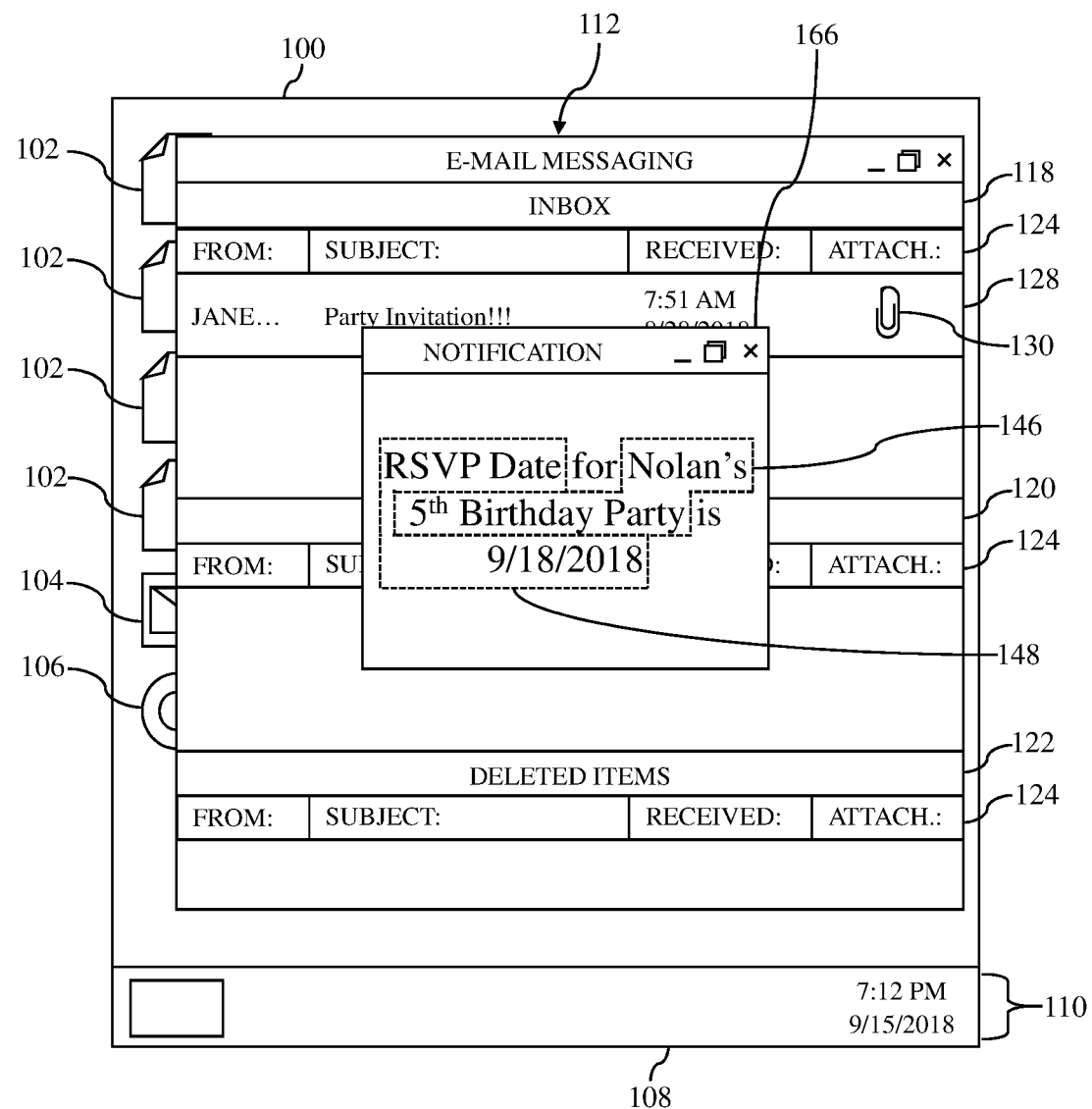
FIGS. 21 and 22 depict various illustrative front views of the inbox for the e-mail messaging application including a notification, according to further embodiments.
Figure 22:
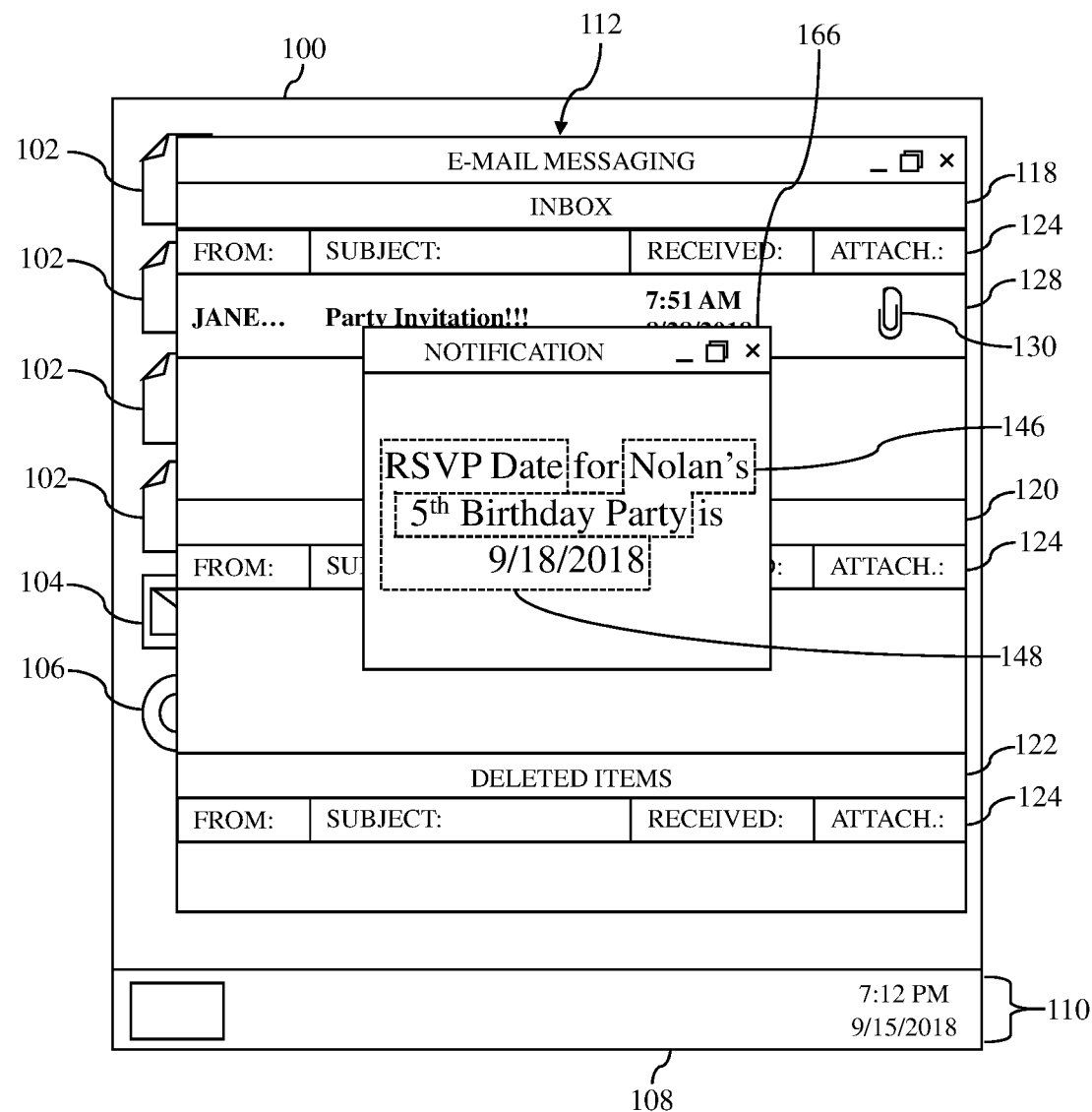

FIGS. 21 and 22 show non-limiting examples of e-mail messaging application 112 at a later date and time (e.g., 9/15/2018 at 7:12 PM) than discussed herein with respect to FIGS. 18-20. Additionally as shown in FIGS. 21 and 22, e-mail messaging application 112 may include a notification 166 provided to the user on display 100. As discussed herein, notification 166 may pertain to e-mail message 128. In the non-limiting examples, notification 166 may be provided to the user if e-mail message 128 is previous read and/or viewed (see, FIG. 21) or not-yet read and/or viewed (see, FIG. 22). Notification 166 may be provided as a pop-up visual or reminder relating to identified future event 146 and/or generated expiration deadline 148 for e-mail message 128. Additionally, notification 166 on display 100 may be generated and provided to the user of e-mail messaging application 112 after determining that generated expiration deadline 148 for identified future event 146 has not yet lapsed. Continuing the example discussed herein with respect to FIG. 20, notification 166 shown in FIGS. 21 and 22 may be generated and provided to the user of e-mail messaging application 112 after it is determined that the current time and/or date (e.g., 7:12 PM on Sep. 15, 2018 (9/15/2018)) has not lapsed, surpassed, and/or exceeded generated expiration deadline 148 (e.g., Sep. 18, 2018 (9/18/2018) at 11:59 PM) for identified future event 146 (e.g., Nolan's $5^{th}$ Birthday Party) of e-mail message 128. In the non-limiting example shown in FIGS. 21 and 22, generated and provided notification 166 may include information and/or text relating to identified future event 146 and/or generated expiration deadline 148.

FIGS. 23-26 shows additional non-limiting examples of e-mail messaging application 112. Specifically, FIGS. 23-26 show additional non-limiting examples of e-mail messaging application 112 after generated expiration deadline 148 (e.g., Sep. 18, 2018 (9/18/2018) at 11:59 PM) for identified future event 146 (e.g., Nolan's $5^{th}$ Birthday Party) of e-mail message 128 has lapsed. As similarly discussed herein with respect to FIGS. 8, 9, 16, and 17, the non-limiting examples shown in FIGS. 23-26 may include non-limiting examples when the user of e-mail messaging application 112 doesn't open and/or read e-mail message 128 (e.g., remains bolded).

More specifically in the non-limiting examples, user of e-mail messaging application 112 may not open or read e-mail message 128 by generated expiration deadline 148 for identified future event 146.

Figure 23:
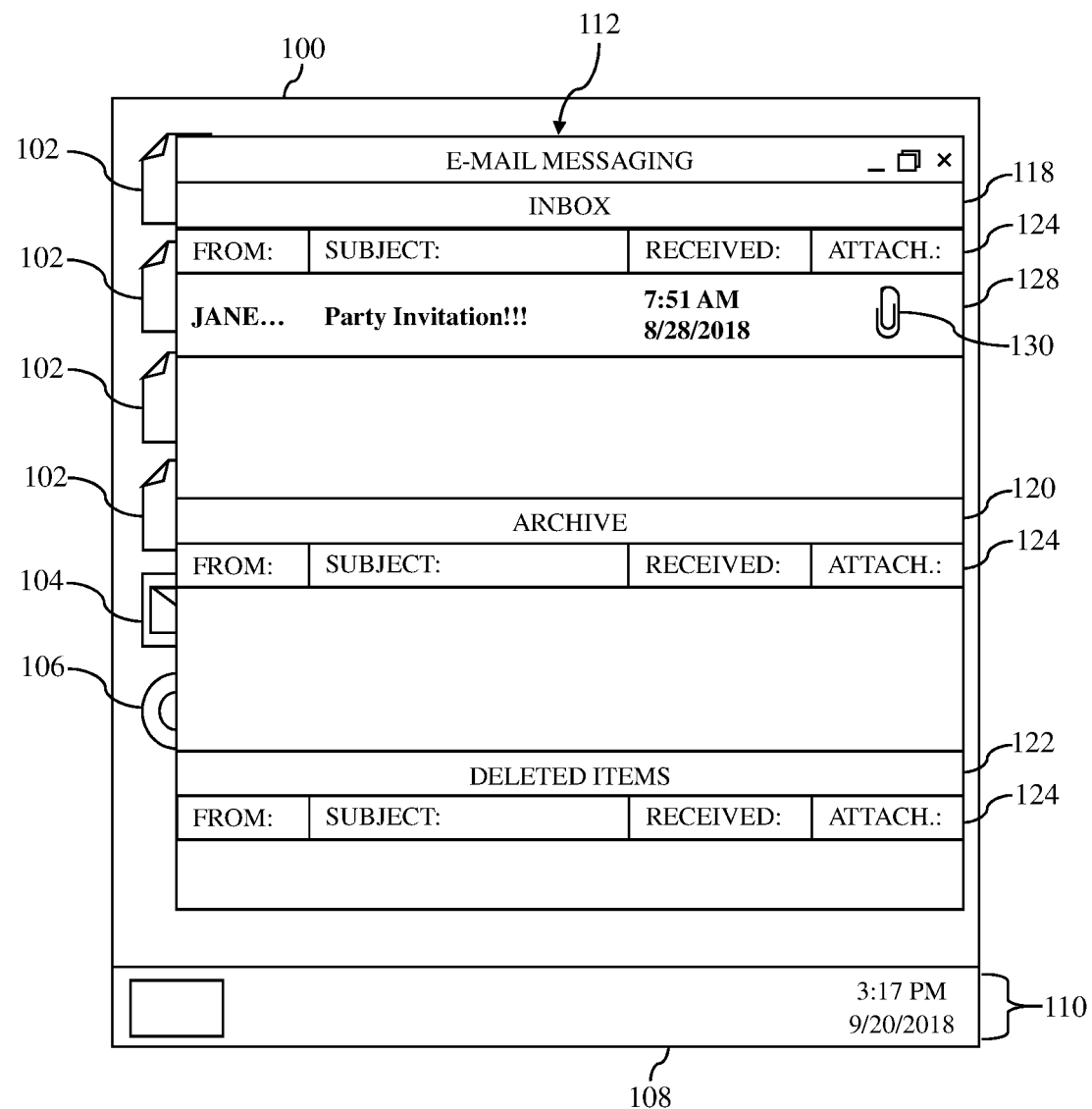
FIGS. 23-26 depict various illustrative front views of the inbox for the electronic mail messaging application after dynamically adjusting a status of the e-mail message of FIG. 19, according to further embodiments.

As discussed herein, and in response to determining that expiration deadline 148 for future event 146 has lapsed, the status of e-mail message 128 may or may not be dynamically adjusted. For example, and as shown in FIG. 23, the status of e-mail message 128 may not be adjusted at all, as e-mail message 128 remains bolded, stored in inbox 118, and includes attachment 162 (see, FIG. 19), as indicated by attachment symbol 130. As similar discussed herein with respect to FIGS. 6 and 7, the status of e-mail message 128 may not be dynamically adjusted based on predetermined policies associated with e-mail message 128. For example, in evaluating and/or analyzing e-mail message 128 (see, FIG. 19), and more specifically from-section 132, it may be determined that the sender or sending source of e-mail message 128 is not a work associate, but rather a personal associate or friend (e.g., "JANE@EMAIL.COM"). As such, and based on predetermined policies relating to e-mail messages associated with non-work e-mail message senders or personal friends, the status of e-mail message may not be dynamically adjusted after determining generated expiration deadline 148 for identified future event 146 has lapsed.

Figure 24:
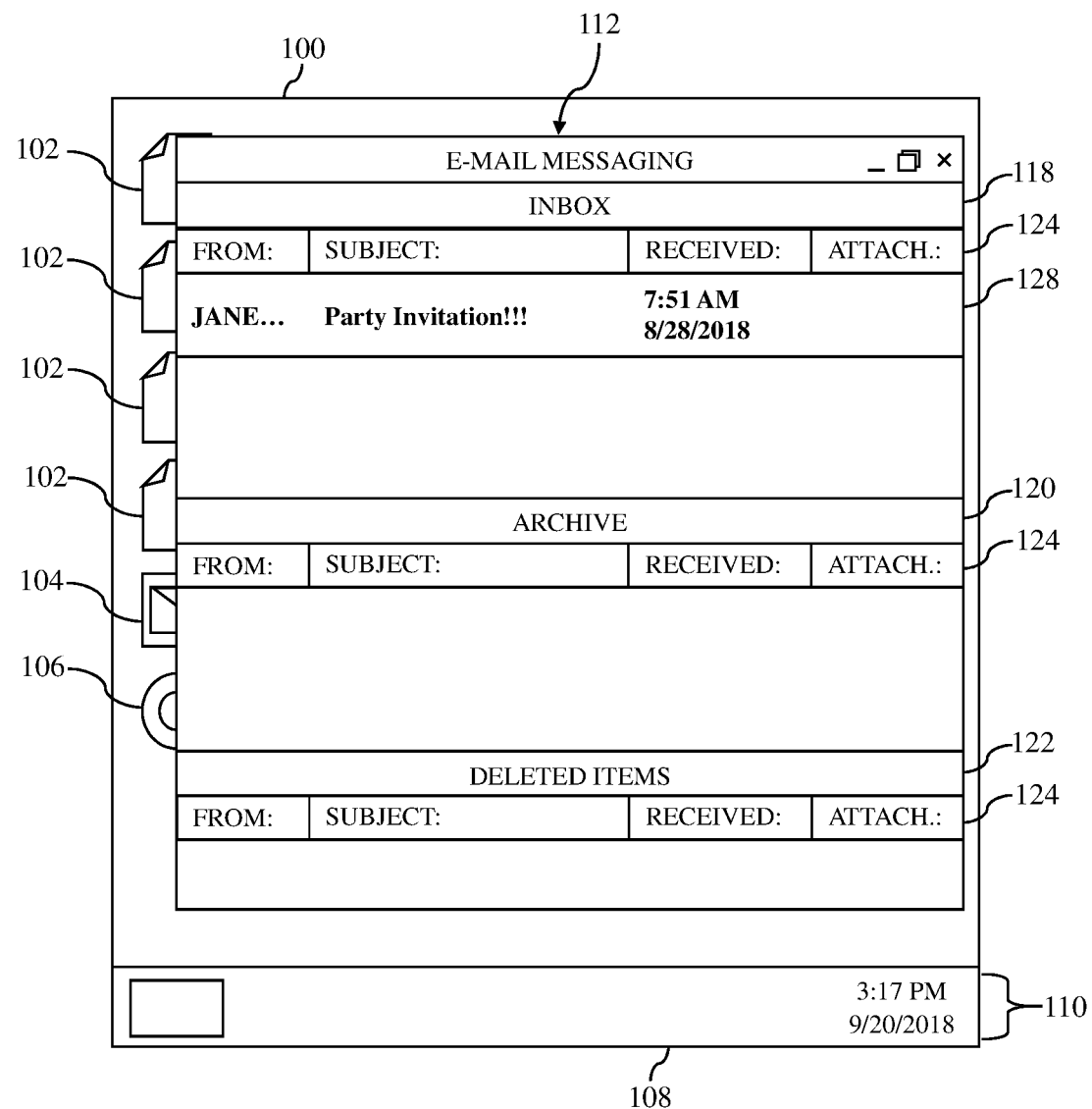
Figure 25:
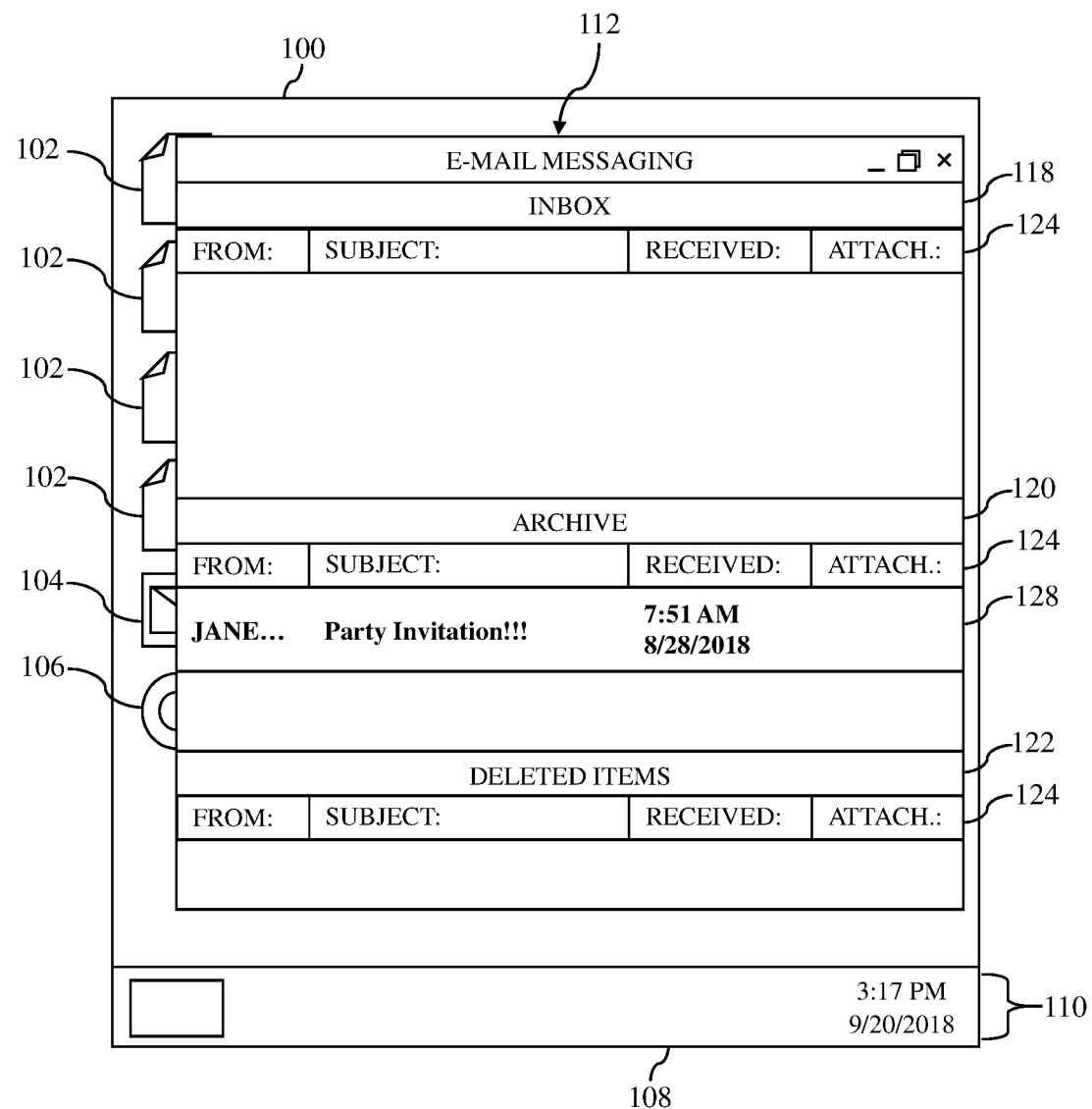
Figure 26:
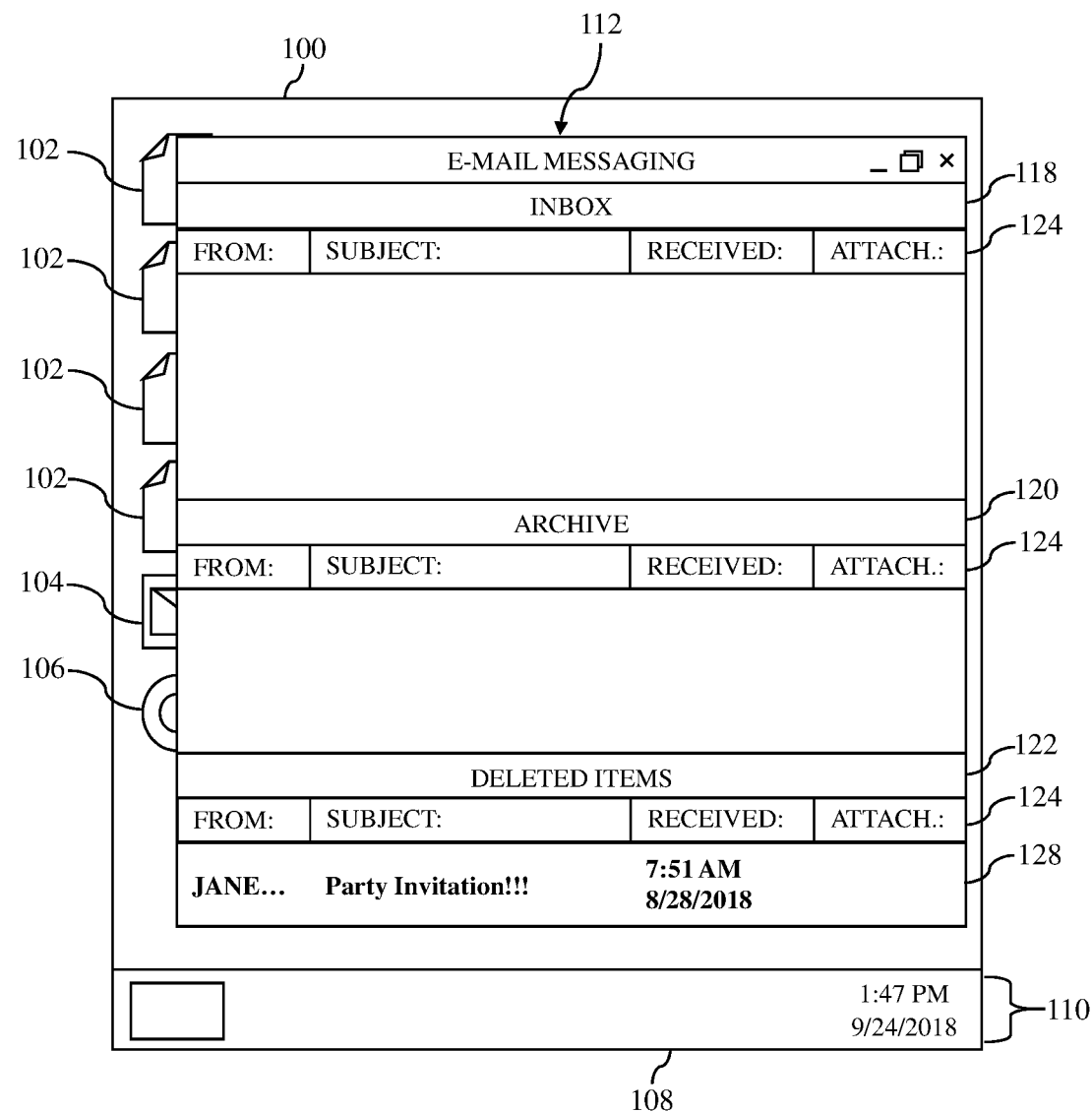

Turning to the non-limiting example shown in FIGS. 24-26, and similar to the non-limiting examples discussed herein (see, FIGS. 13 and 14), the status of e-mail message 128 may be dynamically adjusted by removing and/or automatically deleting attachment 162 (see, FIG. 19) included with e-mail message 128, as well as removing attachment symbol 130 from being displayed with e-mail message 128 in e-mail messaging application 112. In the non-limiting example shown in FIG. 24, e-mail message 128 may remain in inbox 118 of e-mail messaging application 112. However, and as shown in FIGS. 25 and 26, the status of e-mail message 128 may be dynamically adjusted such that e-mail message 128 is automatically moved from inbox 118 (see, FIG. 18) of e-mail messaging application 112 to archive 120 (see, FIG. 25) or deleted items 122 (see, FIG. 26) of e-mail messaging application 112. Because the user did not open or read e-mail message 128, the text of e-mail message 128 shown in e-mail messaging application 112 may remain bolded, as discussed herein.

Figure 27:
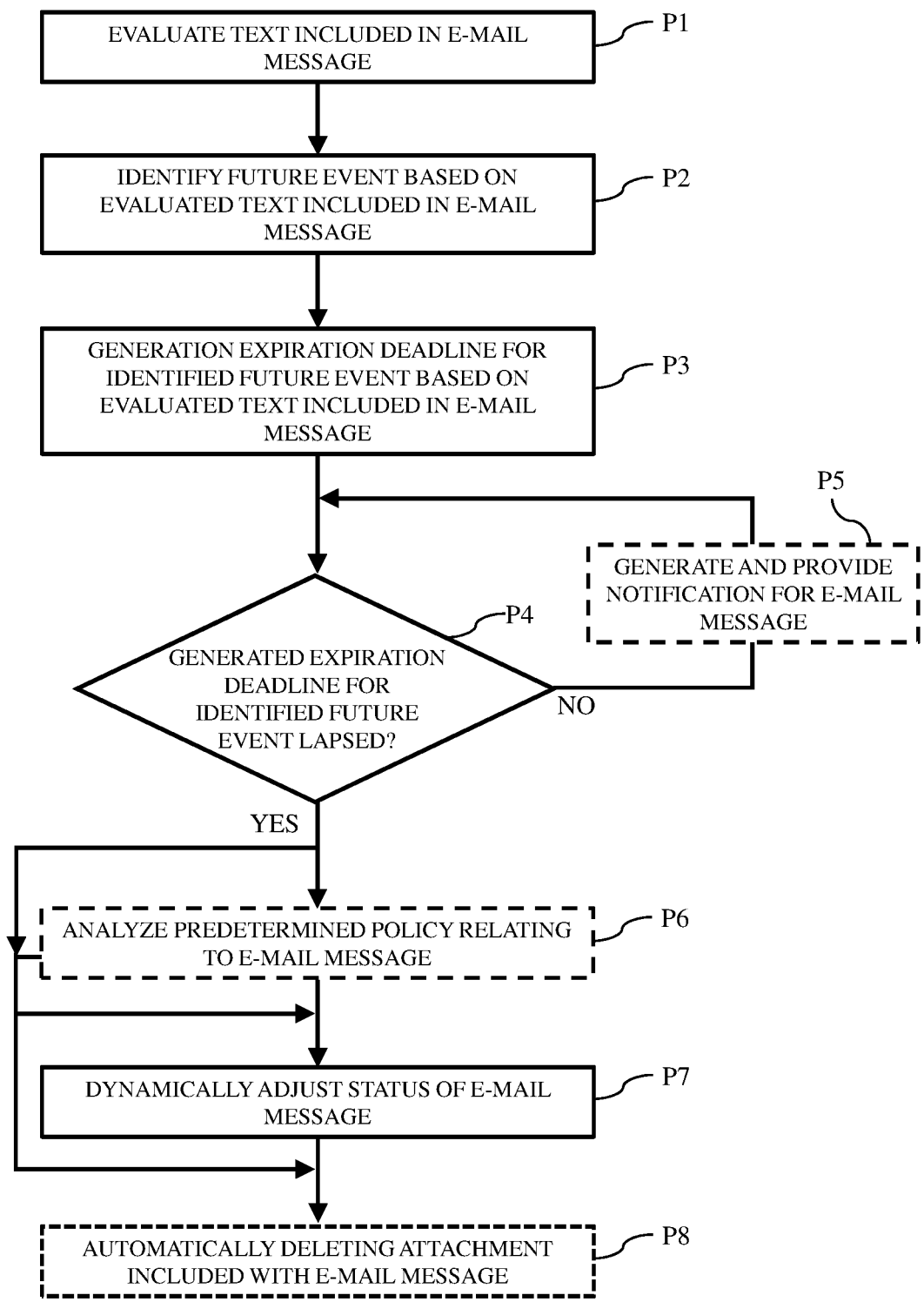
FIG. 27 depicts a flow chart of an example process for dynamically managing e-mail messages, according to embodiments.

FIG. 27 shows a flow diagram illustrating non-limiting example processes of dynamically managing e-mail messages of an e-mail messaging application. These processes can be performed, e.g., by at least one computing device and/or computing system (see, FIG. 28), as described herein. Additionally as discussed herein, the e-mail messaging application may be included within, operate, and/or be engaged on the at least one computing device and/or computing system. In other cases, these processes can be performed according to a computer-implemented method of dynamically managing e-mail messages of an e-mail messaging application. In still other embodiments, these processes can be performed by executing computer program code on the computing device(s) included in computing system(s) and/or system(s), causing the computing device(s) and/or system(s) to dynamically managing e-mail messages of an e-mail messaging application.

In process P1, the text included in an e-mail message of an e-mail messaging application is evaluated. The evaluated text of the e-mail messaging application may include, but is not limited to, the text included in the message body of the e-mail message, the text included in the subject line of the e-mail message, the sending source for the e-mail message, and/or the text of an attachment included with the e-mail message. As such, evaluating the text in an e-mail message can include evaluating text included in the message body of the e-mail message, evaluating text included in the subject line of the e-mail message, evaluating the sending source of the e-mail message, and/or evaluating text of the attachment included with the e-mail message. The text of the e-mail message may be evaluated using any suitable NLP protocol and/or process.

In process P2, a future event is identified. More specifically, a future event is identified based on the evaluated text included in the e-mail message (e.g., process P1). As such, the future event may be identified based on and/or using the evaluated text included in the message body of the e-mail message, the evaluated text included in the subject line of the e-mail message, the evaluated sending source of the e-mail message, and/or the evaluated text of the attachment included with the e-mail message.

In process P3, an expiration deadline is generated. Specifically, an expiration deadline may be generated for the identified future event (e.g., process P2). The expiration deadline for the identified future event may be generated and/or based on the evaluated text included in the e-mail message (e.g., process P1). Similar to the identified future event, the expiration deadline may be generated based on and/or using the evaluated text included in the message body of the e-mail message, the evaluated text included in the subject line of the e-mail message, the evaluated sending source of the e-mail message, and/or the evaluated text of the attachment included with the e-mail message. The generated expiration deadline may correspond and/or correlate to a determined or generated time and/or date.

In process P4, it is determined if the generated expiration deadline for the identified future event has lapsed. Determining if the generated expiration deadline for the identified future event has lapsed may include comparing the current time and/or date with the corresponding and/or correlating time and/or date of the generated expiration deadline (e.g., process P3). The current time and/or date may be continuously compared, or compared at predetermined intervals, with the corresponding and/or correlating time and/or date of the generated expiration deadline to determine if the generated expiration deadline has lapsed.

In response to determining the generated expiration deadline for the identified future event has not lapsed (e.g., "NO" at process P4), then optional process P5 may be performed. In process P5 (shown in phantom), a notification for e-mail message may be generated and provided to a user of the e-mail messaging application and/or user receiving the e-mail message. Specifically, in response to determining the generated expiration deadline for the identified future event has not lapsed, a notification for the e-mail may be generated. The generated notification may include the identified future event (e.g., process P2) and/or the generated expiration deadline (e.g., process P3). Once generated, the notification may be provided to the user of the e-mail messaging application and/or user receiving the e-mail message. The generated and provided notification may include, but is not limited to, a pop-up visual or reminder that is provided to the user receiving the e-mail message. In additional to generating and providing a notification, it may be continuously, or at predetermined intervals, determined if the generated expiration deadline for the identified future event has lapsed (e.g., process P4).

In response to determining the generated expiration deadline for the identified future event has lapsed (e.g., "YES" at process P4), then at least one of processes P6-P8 may be performed. That is, once it is determined that the generated expiration deadline for the identified future event has lapsed, processes P6, P7, and/or P8 may be performed to dynamically manage the electronic e-mail. In some non-limiting examples, all of processes P6-P8 may be performed. In other non-limiting examples, only one of processes P6, P7, or P8 may be performed. Still further in some examples, only a portion of processes P6, P7, and P8 (e.g., only processes P6 and P7, only processes P7 and P8, and so on). Each process will be discussed herein separately.

In optional process P6 (shown in phantom), at least one predetermined policy relating to the e-mail message and/or e-mail messaging application may be analyzed. The predetermined policies may be based on the received e-mail message, the evaluated text included in the e-mail message (e.g., process P1), and/or information relating to the e-mail messaging application (e.g., personal e-mail account or public/free e-mail account). In non-limiting examples discussed herein, the predetermined policies relating to the e-mail message may be analyzed to determine how the status of the e-mail message may be dynamically adjusted. That is, and as discussed herein, the status of the e-mail may be dynamically adjusted in accordance with the analyzed, predetermined policies relating to the received e-mail message.

In process P7, the status of the e-mail message may be dynamically adjusted. That is, in response to determining that the generated expiration deadline for the identified future event has lapsed (e.g., "YES" at process P4), the status of the e-mail message may be dynamically adjusted. In non-limiting examples, dynamically adjusting the status of the e-mail message may include changing the e-mail message from being visually represented as unread, to read—even if the user did not in fact read the e-mail message. In another non-limiting example, dynamically adjusting the status of the e-mail message may be dynamically and/or automatically moving the e-mail message between subsection or folders within the e-mail messaging application. Specifically, dynamically adjusting the status of the e-mail message may include automatically deleting the e-mail message or moving the e-mail message from an inbox folder of the e-mail messaging application to the deleted items folder. Alternatively, dynamically adjusting the status of the e-mail message may include automatically archiving the e-mail message or moving the e-mail message from an inbox folder of the e-mail messaging application to the archive folder.

In optional process P8, attachments included in the e-mail message may be deleted. More specifically, and when applicable (e.g., when e-mail message includes an attachment), the attachment included with the e-mail message may be automatically deleted and/or removed from the e-mail message in process P8 (shown in phantom as optional). The attachment may be automatically deleted from the e-mail message in response to determining that the generated expiration deadline for the identified future event has lapsed (e.g., "YES" at process P4). Automatically deleting the attachment from the e-mail message may result in the e-mail message being still accessible to the user, but the attachment may no longer be include and/or the e-mail message may no longer provide access to the attachment when the e-mail message is opened and/or viewed.

Figure 28:
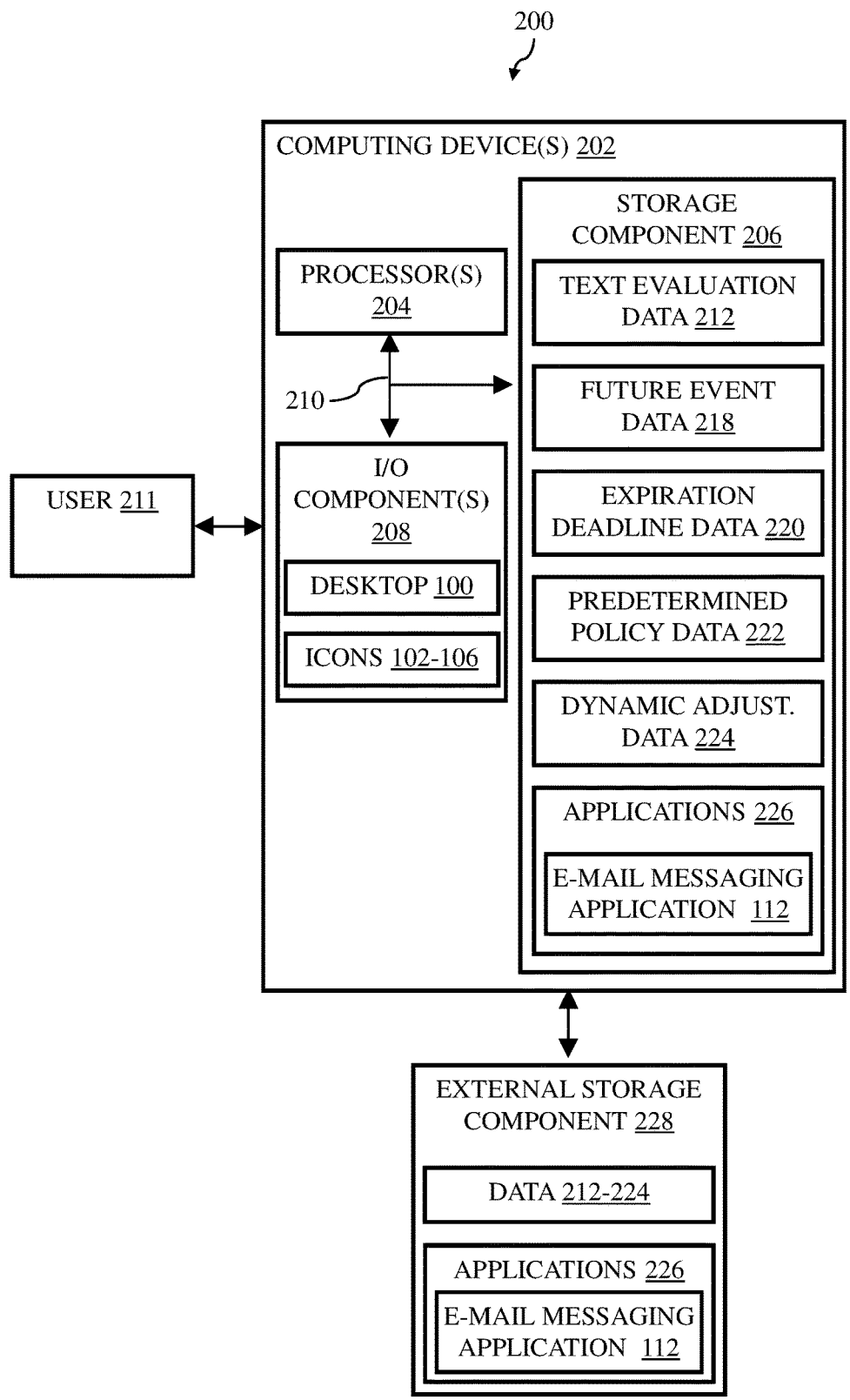
FIG. 28 depicts a schematic view of a computing system configured to dynamically manage e-mail messages, according to embodiments.

FIG. 28 depicts a schematic view of a computing environment or system 200 (hereafter, "computing system 200"), and the various components included within computing system 200. In the non-limiting example shown in FIG. 28, computing system 200 may include at least one computing device 202 that may be configured to dynamically manage e-mail messages included in the e-mail messaging application 112 of computing system 200. It is understood that similarly numbered and/or named components may function in a substantially similar fashion. Redundant explanation of these components has been omitted for clarity.

It is understood that computing device(s) 202 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 200 may include any type of computing device(s) 202 and for example includes at least one processor 204, storage component 206, input/output (I/O) component(s) 208 (including desktop 100 and icons 102, 104, 106), and a communications pathway 210. In general, processor(s) 204 execute program code which is at least partially fixed in storage component 206. While executing program code, processor(s) 204 can process data, which can result in reading and/or writing transformed data from/to storage component 206 and/or I/O component(s) 208 for further processing. The pathway 210 provides a communications link between each of the components in computing device(s) 202. I/O component 208 can comprise one or more human I/O devices, which enable a user 211 to interact with computing device(s) 202. Computing devices 202 may also be implemented in a distributed manner such that different components reside in different physical locations.

Storage component 206 may also include modules, data and/or electronic information relating to various other aspects of computing system 200. Specifically, operational modules and/or data relating to text evaluation data 212, future event data 218, expiration deadline data 220, predetermined policy data 222, and dynamic adjustment data 224. Additionally, storage component 206 may also include operational modules and/or data relating to applications 226 for computing system 200, including e-mail messaging application 112.

Computing system 200, and specifically computing device 202 of computing system 200, may also be in communication with an external storage component 228. External storage component 228 may be configured to store various modules, data and/or electronic information relating to various other aspects of computing system 200, similar to storage component 206 of computing device(s) 202. Additionally, external storage component 228 may be configured to share (e.g., send and receive) data and/or electronic information with computing device(s) 202 of computing system 200. In the non-limiting example shown in FIG. 28, external storage component 228 may include operational modules and/or data relating to text evaluation data 212, future event data 218, expiration deadline data 220, predetermined policy data 222, dynamic adjustment data 224 (shown as "DATA 212-224"), and applications 226 for computing system 200, including e-mail messaging application 112. In a non-limiting example, external storage component may be a cloud-based storage component or system.

Furthermore, it is understood that computing device(s) 202 of computing system 200 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, and then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for dynamically managing an electronic mail (e-mail) message, the method comprising:
   evaluating text included in the e-mail message, wherein evaluating text included in the e-mail message includes evaluating text of an attachment included with the e-mail message;
   identifying a future event based on the evaluated text included in the e-mail message;
   generating an expiration deadline for the identified future event based on the evaluated text included in the e-mail message;
   determining if the generated expiration deadline for the identified future event has lapsed;
   in response to determining the generated expiration deadline for the identified future event has lapsed, dynamically adjusting a status of the e-mail message; and
   in response to determining the generated expiration deadline for the identified future event has lapsed, automatically deleting the attachment included with the e-mail message from the e-mail message, wherein determining if the generated expiration deadline for the identified future event has lapsed includes determining if the e-mail message has been responded to.

2. The method of claim 1, wherein evaluating the text included in the e-mail message further comprises:
   evaluating text included in a message body of the e-mail message.

3. The method of claim 2, wherein evaluating the text included in the e-mail message further comprises at least one of:
   evaluating text included in a subject line of the e-mail message, or
   evaluating a sending source for the e-mail message.

4. The method of claim 1, further comprising:
   in response to determining the generated expiration deadline for the identified future event has not lapsed:
   generating a notification for the e-mail message, the notification including the identified future event, and the generated expiration deadline; and
   providing the notification to a user receiving the e-mail message.

5. The method of claim 1, wherein dynamically adjusting the status of the e-mail message further comprises one of:
   automatically deleting the e-mail message, or
   automatically archiving the e-mail message.

6. The method of claim 1, further comprising:
   analyzing a predetermined policy relating to the e-mail message, the predetermined policy based on the evaluated text included in the e-mail message,
   wherein the status of the e-mail message is dynamically adjusted in accordance with the predetermined policy relating to the e-mail message.

7. The method of claim 6, wherein analyzing the predetermined policy occurs in response to determining that the generated expiration deadline for the identified future event has lapsed.

8. A computer program product stored on a computer readable storage medium, which when executed by a computing system, dynamically manages an electronic mail (e-mail) message, the program product comprising:
   program code that evaluates text included in the e-mail message, wherein evaluating text included in the e-mail message includes evaluating text of an attachment included with the e-mail message;
   program code that identifies a future event based on the evaluated text included in the e-mail message;
   program code that generates an expiration deadline for the identified future event based on the evaluated text included in the e-mail message;
   program code that determines if the generated expiration deadline for the identified future event has lapsed by determining if the e-mail message has been responded to;
   program code that dynamically adjusts a status of the e-mail message in response to the program code determining the generated expiration deadline for the identified future event has lapsed; and
   program code that automatically deletes the attachment included with the e-mail message from the e-mail message in response to determining the generated expiration deadline for the identified future event has lapsed.

9. The program product of claim 8, wherein the program code evaluates the text included in the e-mail message by:
   evaluating text included in a message body of the e-mail message.

10. The program product of claim 9, wherein the program code evaluates the text included in the e-mail message by at least one of:
    evaluating text included in a subject line of the e-mail message, or
    evaluating a sending source for the e-mail message.

11. The program product of claim 8, further comprising:
    program code that generates a notification for the e-mail message in response to determining the generated expiration deadline for the identified future event has not lapsed,
    the generated notification including the identified future event, and the generated expiration deadline; and
    program code that provides the notification to a user receiving the e-mail message.

12. The program product of claim 8, wherein the program code dynamically adjusts the status of the e-mail message by one of:
    automatically deleting the e-mail message, or
    automatically archiving the e-mail message.

13. The program product of claim 8, further comprising:
    program code that analyzes a predetermined policy relating to the e-mail message, the predetermined policy based on the evaluated text included in the e-mail message,
    wherein the program code dynamically adjusts the status of the e-mail message in accordance with the predetermined policy relating to the e-mail message.

14. A system that dynamically manages an electronic mail (e-mail) message, the system comprising:
    a memory; and
    a processor communicatively coupled to the memory, wherein the processor is configured to perform a method comprising:
    evaluating text included in the e-mail message, wherein evaluating text included in the e-mail message includes evaluating text of an attachment included with the e-mail message;
    identifying a future event based on the evaluated text included in the e-mail message;
    generating an expiration deadline for the identified future event based on the evaluated text included in the e-mail message;
    determining if the generated expiration deadline for the identified future event has lapsed, wherein determining if the generated expiration deadline for the identified future event has lapsed includes determining if the e-mail message has been responded to;

in response to determining the generated expiration deadline for the identified future event has lapsed, dynamically adjusting a status of the e-mail message; and in response to determining the generated expiration deadline for the identified future event has lapsed, automatically deleting the attachment included with the e-mail message from the e-mail message.

15. The system of claim 14, wherein evaluating the text included in the e-mail message further comprises:

evaluating text included in a message body of the e-mail message.

16. The system of claim 15, wherein evaluating the text included in the e-mail message further comprises at least one of:

evaluating text included in a subject line of the e-mail message, or evaluating a sending source for the e-mail message.

17. The system of claim 14, wherein the method further comprises:

in response to determining the generated expiration deadline for the identified future event has not lapsed:

generating a notification for the e-mail message, the notification including the identified future event, and the generated expiration deadline; and providing the notification to a user receiving the e-mail message.

18. The system of claim 14, wherein dynamically adjusting the status of the e-mail message further comprises one of:

automatically deleting the e-mail message, or automatically archiving the e-mail message.

19. The system of claim 14, wherein the method further comprises:

analyzing a predetermined policy relating to the e-mail message, the predetermined policy being based on the evaluated text included in the e-mail message, wherein the status of the e-mail message is dynamically adjusted in accordance with the predetermined policy relating to the e-mail message.

20. The system of claim 19, wherein analyzing the predetermined policy occurs in response to determining that the generated expiration deadline for the identified future event has lapsed.

* * * * *